(12) United States Patent
Washington

(10) Patent No.: US 7,642,676 B2
(45) Date of Patent: Jan. 5, 2010

(54) CONTACT VERIFICATION METHOD FOR A TRANSFER SWITCH MECHANISM

(75) Inventor: Rodney B. Washington, Raleigh, NC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 11/590,341

(22) Filed: Oct. 30, 2006

(65) Prior Publication Data

US 2008/0100146 A1    May 1, 2008

(51) Int. Cl.
*H01H 47/00* (2006.01)
(52) U.S. Cl. ...................................... 307/130
(58) Field of Classification Search ................. 307/130
See application file for complete search history.

(56) References Cited

U.S. PATENT DOCUMENTS

| | | | | |
|---|---|---|---|---|
| 4,924,166 | A | 5/1990 | Roussel | 318/608 |
| 5,223,775 | A | 6/1993 | Mongeau | 318/432 |
| 5,432,421 | A | 7/1995 | Kessler et al. | 318/538 |
| 5,784,240 | A * | 7/1998 | Przywozny | 361/85 |
| 6,100,604 | A | 8/2000 | Morroni et al. | 307/64 |
| 6,859,030 | B2 | 2/2005 | Otte | 324/166 |
| 2002/0079741 | A1 * | 6/2002 | Anderson | 307/64 |
| 2006/0131146 | A1 | 6/2006 | Filippenko | 200/50.33 |

OTHER PUBLICATIONS

Freescale Semiconductor Technical Data, 5.0 A H-Bridge with Load Current Feedback,: Freescale Semiconductor, Inc., No. MC33887, Rev. 10.0, dated Jul. 2005, 32 pages.
"Electric Motr," http://en.wikipedia.org/wiki/Dc_motor, dated Sep. 29, 2006, 4 pages.
"The Adaptive Interference Canceler As A Notch Filter," Adaptive Signal Processing, Bernard Widrow and Samuel D. Sterns, 1985, pp. 316-323.
"Application 4: Adaptive Noise Cancelling Applied to A Sinusoidal Interference," Adaptive Filter Theory, Fourth Edition, Simon Haykin, 2002, pp. 246-252.

* cited by examiner

*Primary Examiner*—Albert W Paladini
*Assistant Examiner*—Carlos Amaya

(57) ABSTRACT

An algorithm for verifying the state of switches (such as in a transfer switch mechanism) and for controlling the switches. The control algorithm controls automatic actuation of the switches. The verification algorithm measures the instantaneous voltage on the source and load sides of one or both switches and calculates the RMS magnitude, period, and relative phase for each voltage measurement. If the voltage characteristics for the load do not match any of those for any source, an error is outputted. If the voltage characteristics of the sources match each other, the algorithm determines that they are synchronized. The algorithm determines which switch is closed by comparing the voltage characteristics of the load and of each source, and if there is a match, then the switch associated with the source that is matched with the load is determined to be closed. Otherwise, the switch is determined to be opened.

12 Claims, 24 Drawing Sheets

CONTACT VERIFICATION METHOD FOR A TRANSFER SWITCH MECHANISM

FIELD OF THE INVENTION

This invention is directed generally to switches, and, more particularly, to a contact verification method for a switch.

BACKGROUND OF THE INVENTION

A transfer switch is an electromagnetic mechanism that controls to which power source a load is connected, such as between a utility (main) power source and a backup power source. An automatic transfer switch can include a DC motor that drives an attached mechanical device, which is typically coupled to the motor through an intermediary gearing system such as a gearbox.

As the motor is switching between power sources, eventually the mechanism will reach a point where it cannot be moved any further, requiring intervention to stop the motor from driving the mechanism. If the motor is continues to turn, the motor and gearbox can be damaged and cause the system to fail to operate. The motor can be damaged by twisting the motor shaft or loosening or breaking the motor's mounting to the device. The gearbox can be damaged by cracking the gears, breaking off gear teeth, or loosening or breaking the gearbox's mounting to the device.

A common solution to prevent the motor from driving the mechanism into failure is to provide limit switches to stop the motor when a terminus point has been reached. Limit switches, however, suffer from low reliability, they add complexity and cost to the system, and they undesirably increase the overall size of the transfer switch. Another solution is to attach an external sensor, such as a tachometer or an optical or magnetic encoder, to the motor shaft that provides data indicating the position of the motor. Like the limit switches, external sensors add complexity, cost, and size to the system.

In addition, a transfer switch must assure that its load is connected to only one of the sources at a time. Exclusively connecting to just one source or the other is usually implemented using a mechanical interlock. A transfer switch is composed of one switch per source that when closed connects the load to that source. The interlock mechanically permits only one switch to be actuated to a closed position at a time.

However, the actuating mechanism of a switch, such as a handle, cannot always be guaranteed to close or open the electrical contacts of the switch. If the handle, or other critical internal part, were to break, the switch could be electrically closed although the switch has been actuated to an open position.

In the case of the transfer switch, such breakage would cause the mechanical interlock to fail allowing multiple sources to be connected to the load, causing two asynchronous power sources to short together thereby potentially damaging both. A breakage could also cause a powered source to reverse power an un-powered source. If a backup generator were running and connected to an un-powered utility line, the utility line would become back-fed and pose a serious safety hazard to the utility lineman.

Thus, a need exists for an improved apparatus and method. The present invention is directed to satisfying one or more of these needs and solving other problems.

SUMMARY OF THE INVENTION

In an aspect of the present invention, a method is provided of verifying a position of a transfer switch mechanism for connecting a load to one of at least two power sources, the transfer switch mechanism having at least two positions adapted to electrically couple the load to one of the at least two power sources. The method includes measuring a voltage across the load and across each of the at least two power sources; calculating, based on the measuring, one or more voltage characteristics of the voltage across the load and across each of the at least two power sources, the one or more voltage characteristics being at least one of a magnitude, a period, or a phase; determining whether the one or more voltage characteristics associated with the load matches the one or more voltage characteristics associated with any of the at least two power sources; responsive to the determining, providing data indicating whether each of the at least two positions is in an open state or a closed state; and actuating the transfer switch mechanism based on the data to change at least one of the at least two positions. The method can further include determining that the at least two power sources are synchronized when the one or more voltage characteristics associated with respective ones of the at least two power sources match within a predetermined tolerance. The method can further include outputting a measurement error if the one or more voltage characteristics associated with the load does not match any of the one or more voltage characteristics associated with each of the at least two power sources.

The one or more voltage characteristics can include the magnitude, the period, and the relative phase, the magnitude being a root mean squared (RMS) magnitude of the measured voltage. The voltage can be an instantaneous voltage, and the at least two power sources can be asynchronous relative to one another.

According to another aspect of the present invention, a method of automatically controlling a plurality of switches, each connected to one of a plurality of power sources includes measuring an instantaneous voltage on a load connectable to any one of the power sources; measuring an instantaneous voltage on each of the power sources; calculating a set of voltage characteristics for each of the load and the power sources based on their respective instantaneous voltage measurements, the voltage characteristics including a voltage magnitude, period, and phase; determining whether the set of voltage characteristics for the load matches within a predetermined tolerance the set of voltage characteristics for any of the power sources; and responsive to determining a match between the load and a selected one of the power sources, storing data indicating a state of the switch associated with the selected power source. The method can further include determining whether the set of voltage characteristics associated with any two of the power sources match one another within a predetermined tolerance, and, if so, indicating that those two power sources are synchronized. The method can still further include determining whether the set of voltage characteristics for the load matches, within a predetermined tolerance, any of the set of voltage characteristics for the power sources, and, if none of the set of voltage characteristics for the power sources matches within the predetermined tolerance the set of voltage characteristics for the load, outputting an error.

In other aspects, the method can include, responsive to the determining the match between the load and the selected one of the power sources, storing data indicating a state of the switch associated with another one of the power sources besides the selected power source. The method can further include instructing a first one of the switches to move to an open position; responsive to the instructing the first switch, confirming whether the first switch is in the open position by comparing the set of voltage characteristics for the load with the set of voltage characteristics for the power source associated with the first switch; and if the comparing confirms that the first switch is in the open position, instructing a second one of the switches to move to a closed position, and, responsive to the instructing the second switch, confirming whether the second switch is in the closed position by comparing the set of voltage characteristics for the load with the set of voltage characteristics for the power source associated with the second switch.

In some aspects, the method can further include determining whether any two of the of the power sources are synchronized, and, if so, instructing at least one of the switches to move to an open position. The switches can be disposed in a transfer switch mechanism having a motor for automatically moving each of the switches from open and closed positions. Or, the switches can be disposed in a circuit breaker.

In an embodiment of the present invention, a method of automatically controlling a transfer switch mechanism having a DC motor includes applying a voltage to the DC motor of the transfer switch mechanism for a predetermined period of time, applying no voltage to the DC motor for a predetermined period of time, measuring the back electromotive force (EMF) voltage generated by the DC motor when no voltage is applied thereto, and, based on the measuring, calculating the distance the DC motor of the transfer switch mechanism moved. The method can further include detecting a position of the transfer switch mechanism by commanding the DC motor to rotate slowly in a first direction, determining whether the transfer switch mechanism is at a terminus point and, if so, commanding the DC motor to rotate slowly in a second direction opposite the first direction, and, responsive to the determining, storing data indicative of the position of the transfer switch. In some aspects, the transfer switch mechanism is installed into an electrical distribution panel having a plurality of circuit breakers.

The detecting the position of the transfer switch mechanism can further include determining, responsive to the commanding the DC motor to rotate slowly in the second direction, whether the transfer switch mechanism is at a terminus point, and responsive to determining that the transfer switch mechanism is at a terminus point at only one of the first and second directions, modifying the data to indicate the position of the transfer switch mechanism. The method can further include commanding the DC motor to urge the transfer switch mechanism from its present position toward a second position according to a motion profile. The motion profile can include a set of commands that include slowly rotating the DC motor in a direction opposite the second position, running the DC motor at full speed toward the second position, decelerating the DC motor as the transfer switch mechanism reaches the second position until the transfer switch mechanism reaches the second position, and stopping the DC motor when the transfer switch mechanism is in the second position.

In some aspects, the position of the transfer switch is at least one of a utility position, a locked position, or a generator position. The transfer switch mechanism can be connected to a utility power source in the utility position and to a generator or backup power source in the generator position.

In some aspects, "slowly" means less than 50% of the motor's full speed. In some aspects, the voltage is applied by a pulse width modulation circuit. The transfer switch mechanism can be switchable between a load and one of at least two power sources each capable of producing an AC voltage, the method can further include detecting to which power source the load is connected by detecting the phase of the voltage across a first of the at least two power sources, detecting the phase of the voltage across the load, detecting the phase of the voltage across a second of the at least two power sources, adjusting a first counter based on a comparison of the respective signs of the phases of the first power source and the load, adjusting a second counter based on a comparison of the respective signs of the phases of the second power source and the load, comparing the absolute value of the first counter and the second counter, and based on the comparing, storing data representing to which of the at least two power sources the load is connected.

If, based on the comparing, the absolute value of the first counter is greater than the absolute value of the second counter, data can be stored representing that the load is connected to the first power source.

According to another aspect, a system for automatically controlling a transfer switch mechanism coupled to a load and switchable to one of at least two power sources includes a controller circuit; a motor driver circuit coupled to the controller circuit; a plurality of phase comparator circuits, respective ones thereof being connected across the load and respective ones of the at least two power sources and to the controller circuit; and a transfer switch mechanism including a DC motor that is coupled to the motor driver circuit, wherein the controller circuit is programmed to: determine a distance traveled by the transfer switch mechanism, determine a position of the transfer switch mechanism by comparing the respective phases of the voltages across the load and respective ones of the at least two power sources, and, in response to determining the position of the transfer switch mechanism, command the motor to move to another position according to a motion profile.

In some aspects, the controller circuit determines the distance traveled by the transfer switch mechanism by measuring the back electromotive force (EMF) voltage of the DC motor when no voltage is applied thereto. In some aspects, the system can further include a pulse width modulation circuit coupled to the DC motor for applying voltage to and removing voltage from the DC motor. The motor driver circuit can include an H-bridge.

In some aspects, the motor has a gear ratio of at least 200:1. The controller circuit can include the plurality of phase comparators.

In still further aspects, the controller circuit determines the position of the transfer switch mechanism by commanding the DC motor to rotate slowly in a first direction; determining whether the transfer switch mechanism is at a terminus point and, if so, commanding the DC motor to rotate slowly in a second direction opposite the first direction; and responsive to the determining, storing data indicative of the position of the transfer switch. The motion profile, in some aspects, includes a set of commands that include slowly rotating the DC motor in an opposite direction; running the DC motor at full speed toward the desired position; decelerating the DC motor as the transfer switch mechanism reaches the desired position until the transfer switch mechanism reaches the desired position; and stopping the DC motor when the transfer switch mechanism is in the desired position.

According to another aspect, a method of automatically controlling a transfer switch mechanism having a DC motor, the transfer switch mechanism being connected to a load and switchable between one of at least a utility power source and a backup power source is provided. The method includes calculating a distance that the transfer switch mechanism has been moved by the DC motor; determining the position of the transfer switch mechanism by rotating the DC motor in a first direction and then rotating the DC motor in a second direction opposite the first direction while calculating the distance moved by the DC motor; storing data indicative of the position of the transfer switch mechanism, wherein the position is at least one of a locked position, a utility power source position, or a backup power source position; and automatically detecting whether the transfer switch mechanism is connected to the utility power source or to the backup power source.

According to a still further aspect of the present invention, a method of automatically adapting an instantaneous frequency to a component of a single frequency of a primary signal, the primary signal representing an electrical current provided to a direct current (DC) motor is provided. The method includes synthesizing an incident frequency to produce a complex exponential incident signal; multiplying the complex exponential incident signal by an adaptive coefficient to produce a reference signal, the adaptive coefficient having a magnitude and a phase; subtracting the reference signal from the primary signal to produce an error signal; adapting the adaptive coefficient in a complex single frequency adaptive filter according to a coefficient gradient as a function of at least the error signal; adapting the incident frequency in a phase lock loop (PLL) having an incident frequency adaptation component as a function of a frequency gradient; and responsive to the adapting the incident frequency, calculating a distance traveled by a load coupled to the DC motor from the adapted incident frequency.

The calculating can include calculating an angular speed of the DC motor based on the adapted incident frequency and predetermined geometry parameters of the DC motor. The DC motor can have a predetermined number of poles, a predetermined number of contacts, and a predetermined gear ratio, the predetermined geometry parameters including the number of poles, the number of contacts, and the gear ratio of the DC motor. The calculating can include calculating a motor speed of the DC motor based on the adapted incident frequency and the predetermined geometry parameters.

The method can further include applying the primary signal to a low pass filter prior to the adapting the adaptive coefficient. The method can further include initializing the incident frequency to a fundamental frequency of the DC motor within a range of fundamental frequencies expected across the DC motor when a predetermined load is applied to the DC motor. The method can further include actuating the motor according to a motion profile while adapting the incident frequency and calculating the distance traveled of the load, the load including a transfer switch, the motion profile including slowly reversing the DC motor in a direction opposite the desired direction of transfer; accelerating the DC motor toward full speed in the desired direction of transfer; running the DC motor at full speed; decelerating the DC motor as the transfer switch approaches a terminus point; and removing power to the DC motor prior to the transfer switch reaching the terminus point, allowing the DC motor to coast to the terminus point.

The adaptive coefficient can be a complex number. The adaptation of the incident frequency can include applying a least mean square function to approximate the frequency gradient based on a rate of change of the adaptive coefficient. The applying the least mean square function can approximate the frequency gradient by calculating a difference of the phase of the adaptive coefficient relative to a preceding adaptive coefficient.

The adapting the incident frequency can include calculating a ratio of a cross product and an inner product of the adaptive coefficient relative to a preceding adaptive coefficient to produce an estimate of the rate of change of the adaptive coefficient. The adapting the incident frequency can approximate the frequency gradient by equating the sine of the rate of change of the adaptive coefficient, $$\sin\left(\frac{\partial \phi_n}{\partial n}\right),$$

to the rate of change of the adaptive coefficient, $$\frac{\partial \phi_n}{\partial n},$$

where $\phi_n$ corresponds to the adaptive coefficient and n represents a sample time period.

The adapting the adaptive coefficient can include adapting the adaptive coefficient according to the coefficient gradient as a function of at least the error signal and the incident signal. The adapting the incident frequency can be carried out by approximating a rate of change of the phase of the adaptive coefficient to compute an instantaneous incident frequency corresponding to a single frequency component of the primary signal.

According to a further aspect of the present invention a method of estimating a speed of a motor includes sampling electrical current provided to the motor; monitoring the sampled electrical current to estimate a speed-related harmonic frequency of the motor, the monitoring including calculating a phase and a magnitude of the sampled electrical current in a complex single frequency adaptive filter, and adapting an incident frequency that represents an estimate of the speed-related harmonic frequency of the motor in phase-locked loop coupled to the complex single frequency adaptive filter; calculating the speed of the motor as a function of the adapted incident frequency; and estimating a distance of travel of a load coupled to the motor as a function of the speed.

According to still another aspect of the present invention, a method of automatically determining a distance traveled by a load coupled to a direct current (DC) motor is provided. The method includes causing an electrical current to be applied to the DC motor, the DC motor having a plurality of commutator segments in rotatable contact with a plurality of commutator brushes; detecting leading and trailing edges of pulses in the current caused as each of the commutator segments rotates past respective ones of the commutator brushes; determining the phase of the DC motor based upon the number of the pulses detected, the number of the commutator segments, and the number of the commutator brushes; and calculating a distance traveled by the load connected to the DC motor based on the phase of the DC motor.

The detecting the leading edge can include calculating a change in the current over time; and detecting a positive slope in the current that exceeds a first predetermined threshold level and persists for at least a first predetermined time duration. The detecting the trailing edge can include calculating a change in the current over time; and detecting a negative slope in the current that is less than a second predetermined threshold level and persists for at least a second predetermined time duration.

In some aspects, the method can further include incrementing a pulse counter upon detecting a leading edge in the current followed by detecting a trailing edge in the current, the pulse counter producing the number of pulses. The load can be a transfer switch mechanism, and the method can further include causing the motor to move the transfer switch mechanism adapted to switch a plurality of circuit breakers between at least an on and an off position. The load can be a switch of a circuit breaker, and the method can further include causing the motor to move the switch between at least an on and an off position.

In other aspects, the method can further include removing high-frequency noise from the current by a filter. The method can further include measuring an instantaneous current of the current; and removing high-frequency noise from the instantaneous current by high-frequency filtering the instantaneous current.

According to still another aspect, a method of automatically determining a distance traveled by a load coupled to a direct current (DC) motor having a phase is provided. The method includes causing an electrical current to be applied to the DC motor, which moves the load; sampling the electrical current to produce instantaneous current at selected time intervals; monitoring the instantaneous current, wherein the monitoring includes detecting an increase followed by a decrease in the electrical current in the selected time intervals; incrementing a pulse counter when the detecting detects an increase in electrical current that exceeds a first threshold and persists for at least a first predetermined period of time followed by a decrease in the electrical current that is less than a second threshold and persists for at least a second predetermined period of time; and determining the phase as a function of the value of the pulse counter.

The monitoring can further include removing high-frequency noise from the instantaneous current. The first predetermined period can be reached when a timer has run for a predetermined amount of time. The load can be a transfer switch mechanism in an electrical distribution panel. Or, the load can be a circuit breaker.

The method can further include storing the phase in a computer-readable medium. The method can further include calculating a distance traveled by the load connected to the DC motor as a function of the phase.

In still another aspect of the present invention, a method of automatically determining a distance traveled by a switch that is coupled to a direct current (DC) motor having a phase is provided. The method includes monitoring electrical current supplied to the DC motor coupled to the switch, the monitoring including sampling the electrical current at selected time intervals, calculating a change in the electrical current over time while detecting whether the change represents an increase or a decrease in the electrical current over time, if the change exceeds a first threshold over a first time interval, determining that the change represents a leading edge, and if the change is less than a second threshold over a second time interval, determining that the change represents a trailing edge; incrementing a pulse counter each time a leading edge is determined followed by a trailing edge; determining the phase based on the value of the pulse counter; and calculating a distance traveled by the switch as a function of the phase.

The monitoring can further include filtering the sampled electrical current to remove high-frequency noise. The switch can be part of a transfer switch mechanism in an electrical distribution panel. The switch can also be part of a circuit breaker. The first threshold and the second threshold can be equal in some aspects.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
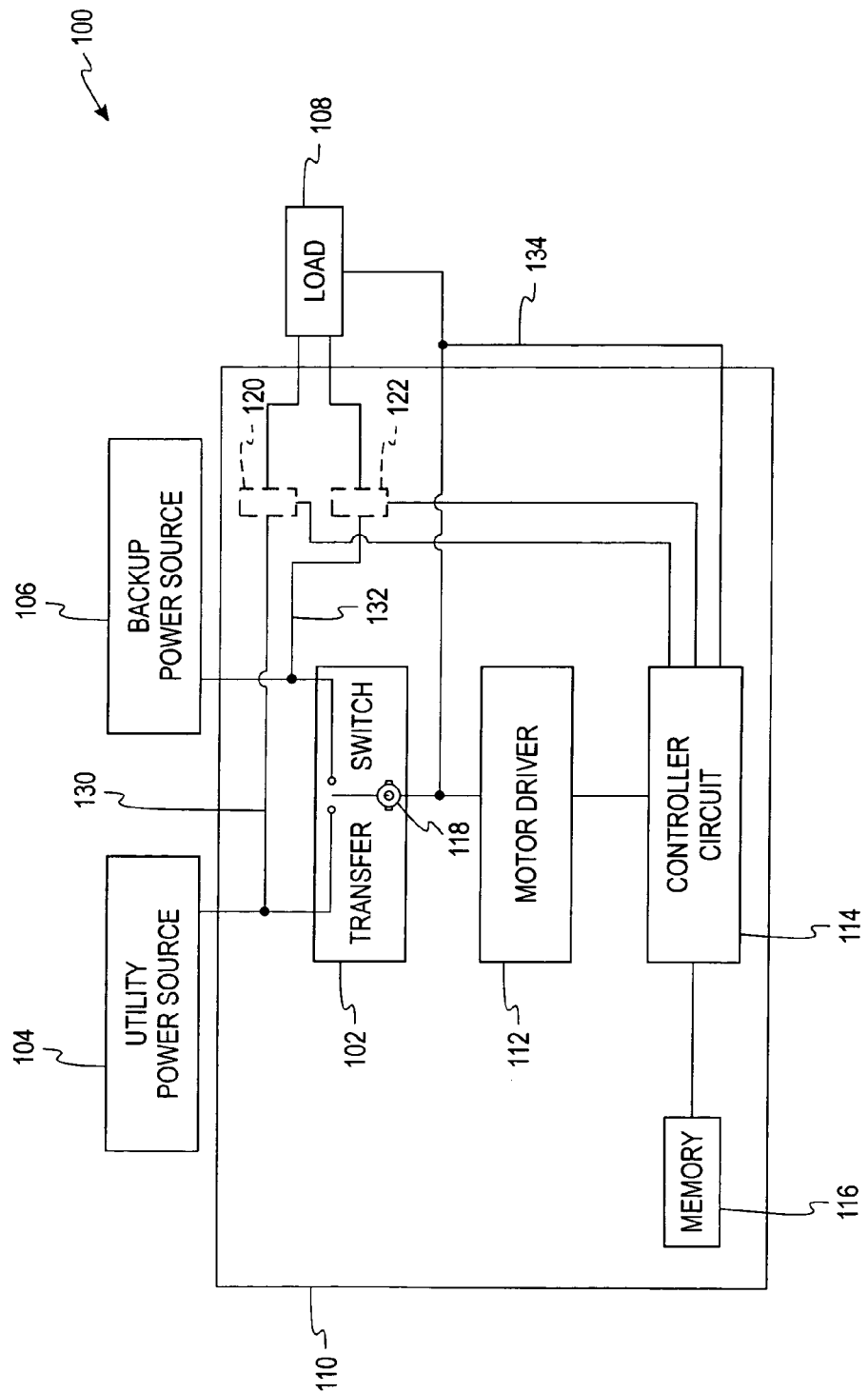
FIG. 1 is a functional block diagram of a system for controlling a transfer switch according to an aspect of the present invention.

Referring now to the drawings and initially to FIG. 1, a functional block diagram of a system 100 for controlling an automatic transfer switch mechanism 102 according to an aspect of the present invention. The transfer switch mechanism 102 allows electrical power to flow from a utility (main) power source 104 or a backup power source 106 (such as a generator) to a load 108. An automatic transfer switch mechanism with a manual override suitable for use with aspects of the present invention is disclosed in U.S. patent application Publication No. 2006/0131146, entitled "Switching Mechanism With Mechanical Interlocking and Manual Override," filed Dec. 22, 2004, the entirety of which is incorporated herein by reference as if fully set forth herein. The transfer switch mechanism 102 is housed within an electrical distribution panel 110 that also includes a motor driver 112, a controller circuit 114, and a memory 116. It should be understood that the controller circuit 114 is an integrated circuit (IC) chip that can also include the motor driver 112 and/or the memory 116. The term "circuit" as used herein includes one or more electrical and/or electromagnetic circuits. The transfer switch mechanism 102 includes a direct-current (DC) motor 118. The distribution panel 110 also includes an optional first phase comparator 120 and an optional second phase comparator 122, which compare the voltage phases of the utility power source 104 or the backup power source 106 with the voltage phase of the load 108. These comparators 120, 122 are used to determine the position of the transfer switch mechanism 102, as will be explained more fully below. Probes 130, 132, 134 connected to the utility power source 104, the backup power source 106, and the load 108 are coupled to the controller 114.

Aspects of the present invention advantageously eliminate the need for limit switches or other external sensors to detect when the motor approaches a terminus point, or a point beyond which the transfer switch mechanism cannot move due to physical limitations. In some aspects, the transfer switch mechanism 102 is dimensioned to fit within or across a tandem-style circuit breaker, such as the QO® tandem-style circuit breaker available from Square D Company, which has a width of approximately 1.5 inches. Design of automatic transfer switch mechanisms applies very strict limitations on the geometry of the motor driving the switch. Prior-art external sensors like limit switches in transfer switch mechanisms added complexity and cost. As the width of circuit breakers decreases, there is less and less space available to include additional components. The present invention eliminates the need for external sensors while still achieving the same benefits offered by such external sensors.

Elimination of the external sensors renders unknown the following pieces of information: the distance the motor in the transfer switch mechanism has traveled (which can be calculated from the angular speed of the motor) and the position of the transfer switch mechanism. For example, the transfer switch mechanism 102 has a handle for manually switching. Without external sensors, the system 100 does not know whether, for example, the operator moved the switch from one position to another. By operating blindly, the transfer switch mechanism could drive the motor beyond a terminus point, causing damage to the gearbox of the motor, to the motor mounting structures, or to the mechanical load attached to the motor.

Three different approaches for measuring the speed of the DC motor 118 are provided herein in no particular order. Generally, the first approach generally measures the back electromotive force (EMF) voltage generated by the DC motor 118 while using pulse width modulation to turn the DC motor 118 on and off and automatically detects the position of the transfer switch mechanism 102. The second approach generally uses adaptive filtering in a software-based complex single frequency (CSF) phase-locked loop (PLL). The third approach measures a frequency of the current pulses produced by the operating brushes of the DC motor (in the case when the DC motor 118 is a brushed DC motor) or the switching frequency of a brushless DC motor 118 (in the case when the DC motor 118 is a brushless DC motor).

Figure 2A:
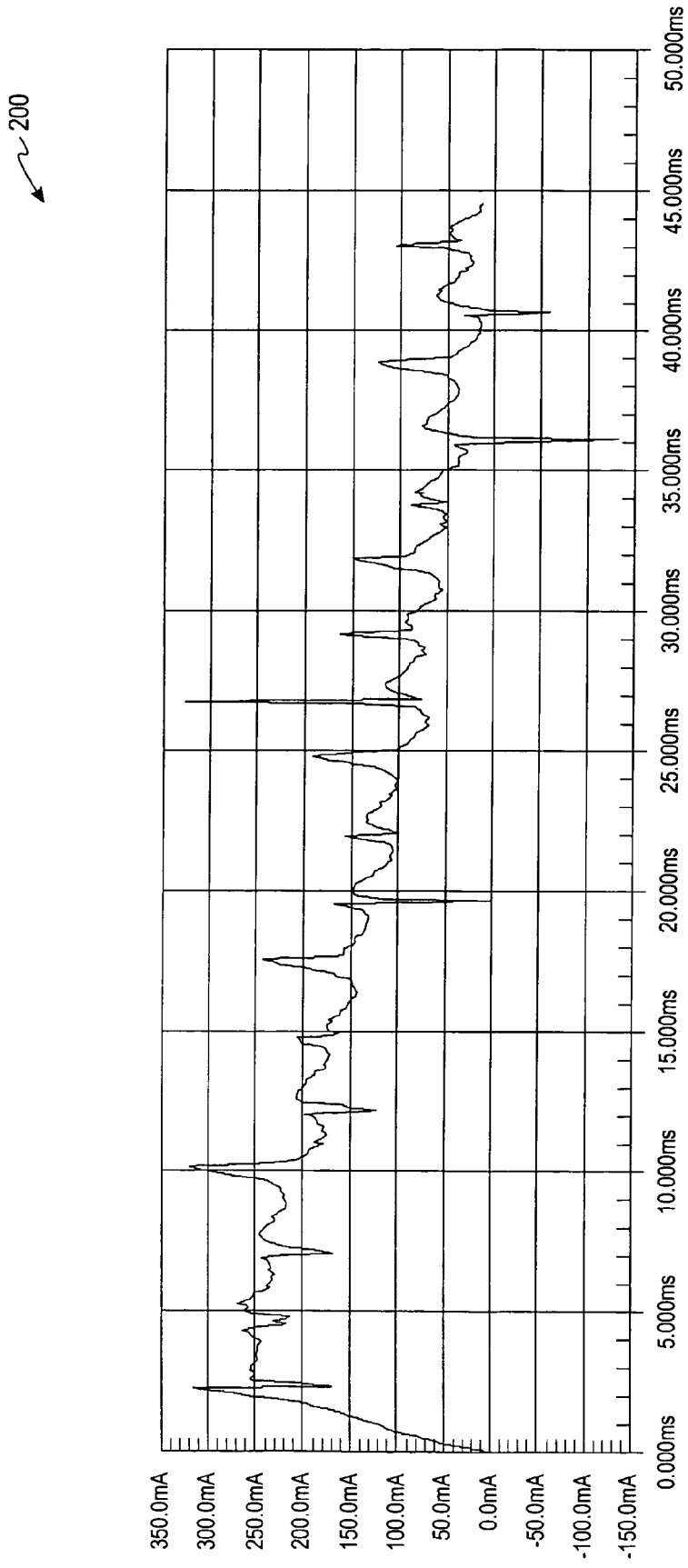
FIG. 2a is a chart depicting the electrical current consumed by a typical DC motor suitable for use with aspects of the present invention.

FIG. 2a is a chart 200 depicting the electrical current consumed by the DC motor 118. In this example, a 24V DC motor from Copal (HG37-200-AB-00) with a 200:1 gear ratio was used. Another motor suitable for use as the DC motor 118 according to any of the aspects described herein, is a 24V DC motor manufactured by Shayang Ye Industrial, part no. RB350200-30U91, having a 200:1 gear ratio. Another suitable DC motor is available from Douglas International Co., part no. KE599+RB35C. As can be seen from FIG. 2a, a distinctive pattern of pulses emerges at a 6× RPM frequency.

In systems including transfer switches, circuit breakers, contactors, and any other system having one or more automatically controlled switches (e.g., where automatic control is supplied via a motor), such as the system 100 described herein, or manually controlled switches, it is desirable to know the actual state of the electrical contacts of each switch. In a system having a transfer switch mechanism, such as transfer switch mechanism 102, a mechanical interlock in the transfer switch mechanism 102 ensures that the load 108 is connected to only one of the sources 104, 106 at a time. If the interlock fails, breaks, or is eliminated, multiple sources can become connected to the load 108, shorting together the power sources (which are typically asynchronous) potentially damaging both. To avoid this potentially hazardous scenario, aspects of the present invention provide for a contact verification method or algorithm that monitors and compares the voltages on both sides (i.e., source and load sides) of each power source 104, 106 in the transfer switch mechanism 102 to verify that the state of the electrical contacts are consistent with the actual state of each source switch. While auxiliary contacts can be used to verify the position of a switch, aspects of the present invention eliminate the need for such auxiliary contacts, though in other aspects, auxiliary contacts can be used with the contact verification implementations described herein. It should be emphasized that the verification algorithm and control algorithm discussed herein can be used in any system having switches or separable electrical contacts. A specific implementation that includes a transfer switch mechanism will be discussed below, but those skilled in the art will readily understand how to apply the verification and control algorithms to any other system having switches or separable electrical contacts, whose states need to be detected and verified.

Referring to FIG. 1, the transfer switch mechanism 102 includes a switch for allowing current to flow between the utility power source 104 and the load 108 when the switch is closed and another switch for allowing current to flow between the backup power source 106 and the load 108 when that other switch is closed. The switches are functionally illustrated in the transfer switch mechanism 102. As mentioned above, a transfer switch mechanism with a mechanical interlock is disclosed in U.S. patent application Publication No. 2006/0131146, entitled "Switching Mechanism With Mechanical Interlocking and Manual Override," filed Dec. 22, 2004, the details of which are not repeated here. Each switch has associated electrical contacts that can be actuated to closed or open positions, thereby making or breaking electrical connection with the source to which the switch is connected. The controller circuit 114 of the distribution panel 110 can optionally receive signals indicating the actuated state (e.g., open or closed) of the switch, but in the event of an interlock failure, for example, the actuated state of the switch may not be the same as the state of the electrical contacts of the switch. The contact verification algorithm described herein can determine whether the actuated state of the switch and the electrical state of the contacts are consistent. If they are not, a contact verification error is reported and the controller 114 can take corrective action, such as issuing an alarm. As used herein, the switch associated with the transfer switch mechanism 102, which allows or disallows electrical current from the utility power source 104 is referred to as switch 1. The switch associated with the transfer switch mechanism 102, which allows or disallows electrical current from the backup power source 106 is referred to as switch 2.

According to one aspect, each of switch 1 and switch 2 has electrical contacts that can be open or closed automatically by the transfer switch mechanism 102 (under control of the controller circuit 114, which issues commands to the motor driver 112, which in turn drives the motor 118) or manually by a handle (not shown) by an operator. According to other aspects, the electrical contacts are contacts that exist in two-pole circuit breakers or contactors. For purposes herein, the discussion below will assume a transfer switch mechanism implementation, but those of ordinary skill in the art will appreciate that the contact verification and control algorithms described herein can be implemented in circuit breakers and contactors as well.

Probes 130, 132 coupled to the utility power source 104 and the backup power source 106, respectively, are coupled to the controller circuit 114. In an implementation, the optional phase comparators 120, 122 are not used, and the controller circuit 114 receives a proportional signal (such as a digitized sample of the instantaneous AC current) representing the voltage and/or current provided by the power sources 104, 106 at selected time intervals via the respective probes 130, 132. Conversion of the analog AC signals to corresponding digital representations can be carried out in the controller circuit 114 or via an analog-to-digital converter that can be incorporated in the controller circuit 114 or coupled thereto.

Preferably, the voltage, as opposed to the current, is measured on the source side and the load side of each switch in the transfer switch mechanism 102. For a single-phase system, the voltage is measured for both L1 and L2. The voltage is measured across each switch rather than the current because when there is no electrical load, there would be no current even when the switch is closed.

Figure 2B:
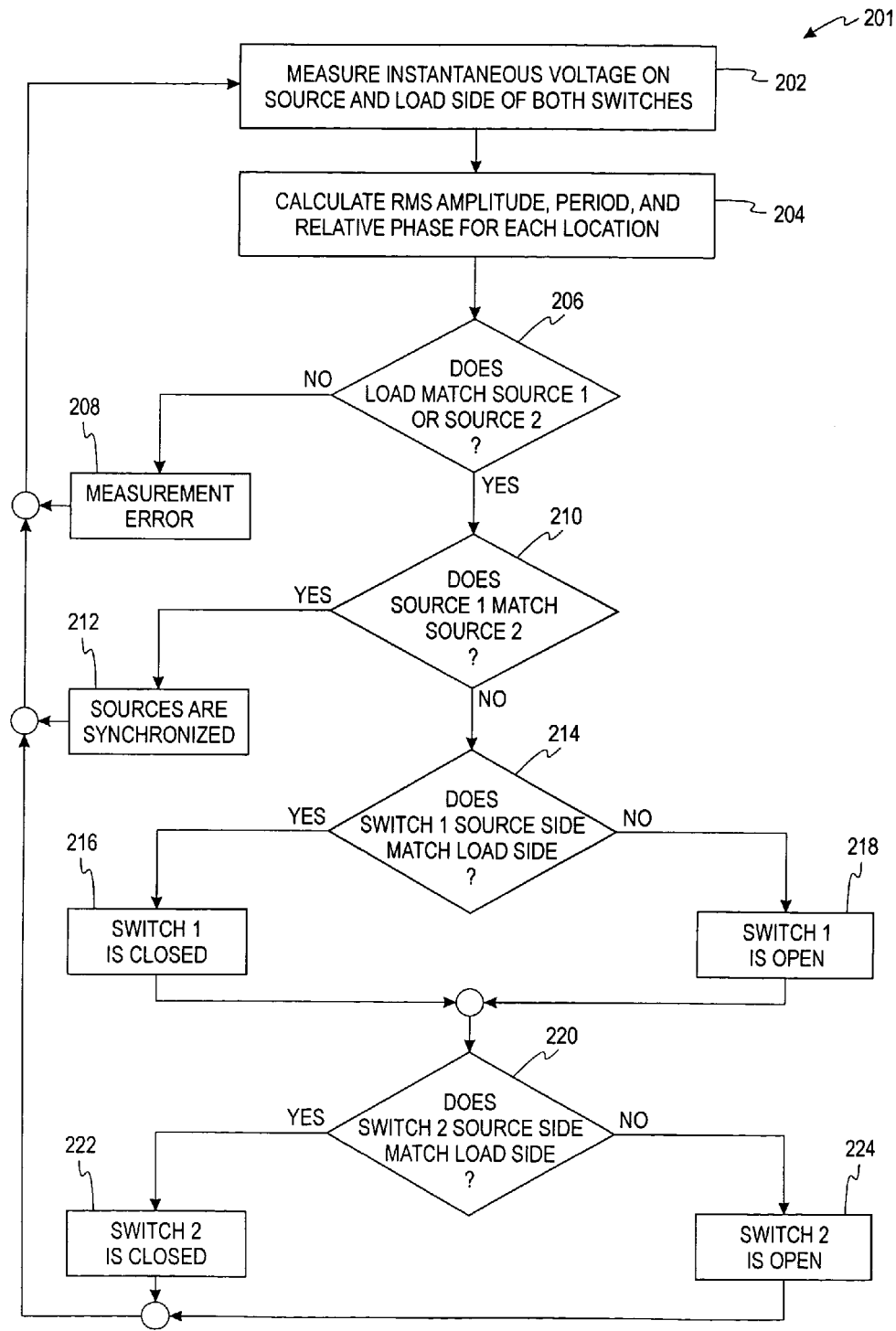
FIG. 2b is a flow chart diagram depicting a contact sensing and verification method that verifies which source is connected through the transfer switch mechanism according to an aspect of the present invention.

FIG. 2b is a flowchart depicting a contact sensing and verification algorithm 201 (variously referred to herein as a contact sensing algorithm or a contact verification algorithm) that senses and verifies which source (e.g., main or backup) is connected through the transfer switch mechanism 102. The contact verification algorithm 201 and associated data can be stored in memory 116. The voltage from the probes 130, 132, 134 are sampled by the controller circuit 114 to supply the instantaneous voltage of all the sources 104, 106 and the load 108 (202). Alternately, only instantaneous voltage of one of the sources 104, 106 (instead of both sources) and the load 108 is measured. In an implementation, the controller circuit 114 measures voltage characteristics including the root mean squared (RMS) magnitude or amplitude of the instantaneous voltage, as well as the period and the relative phase of the sources 104 and 106 and of the load 108 (204). The controller circuit 114 analyzes whether the RMS amplitude, period, and relative phase of any of the sources 104 or 106 matches the RMS amplitude, period, and relative phase data for the load 108 (206). The controller circuit 114 also analyzes whether the RMS amplitude, period, and relative phase of the source 104 matches the corresponding RMS amplitude, period, and relative phase of the source 106.

If the voltage characteristics associated with the load 108 do not match the voltage characteristics of the sources 104, 106, the controller circuit 114 outputs a measurement error (208), and returns to 202. The measurement error can be due to a sensor mis-wiring error where the L1 and L2 wiring on the load and the sources 104, 106 has been reversed. As used herein, the RMS magnitude or amplitude, period, and relative phase represent voltage characteristics of an alternating current (AC) voltage signal.

In another implementation, the controller circuit 114 measures any combination of the voltage RMS magnitude, period, and relative phase for each cycle from the instantaneous voltage measurements. Preferably all three voltage characteristics are measured for reliable matching of the load 108 voltage to one of the possible sources 104, 106, though in other aspects, any one or more of these voltage characteristics can be measured.

If the RMS magnitude, period, and relative phase data of at least one of the sources 104 or 106 match the RMS amplitude, period, and relative phase data of the load 108, the controller circuit 114 analyzes whether the measured data matches within measurement tolerances of the hardware for both of the sources 104 and 106 (210). If so, the sources 104 and 106 are determined to be synchronized (212), and the controller circuit 114 returns to 202. If the voltage characteristic(s) of two or more sources are synchronized, then no contact verification is carried out until the synchronized sources are no longer synchronized. Though two sources are analyzed (210), in other implementations, more than two sources can be analyzed.

If the RMS amplitude, period, and relative phase data is not the same for both sources 104 and 106, the controller circuit 114 analyzes whether the measurement data from the source 104 or 106 matches the measurement data for the load 106 (214). If so, the contact verification algorithm 201 determines that switch 1 is closed (216) and proceeds to determine whether the source side of switch 2 matches the load side (220). If not, the contact verification algorithm 201 determines that switch 1 is open (218) and proceeds to determine whether the source side of switch 2 matches the load side (220).

The voltage characteristics including the RMS magnitude, period, and relative phase data for the source 106 and the load 108 are compared (220). If they are all the same, then it is determined that switch 2 is closed (222). If not, it is determined that switch 2 is open (224). The contact verification algorithm 201 then returns to measure the instantaneous voltage on the source and load sides of both switches (202).

Figure 2C:
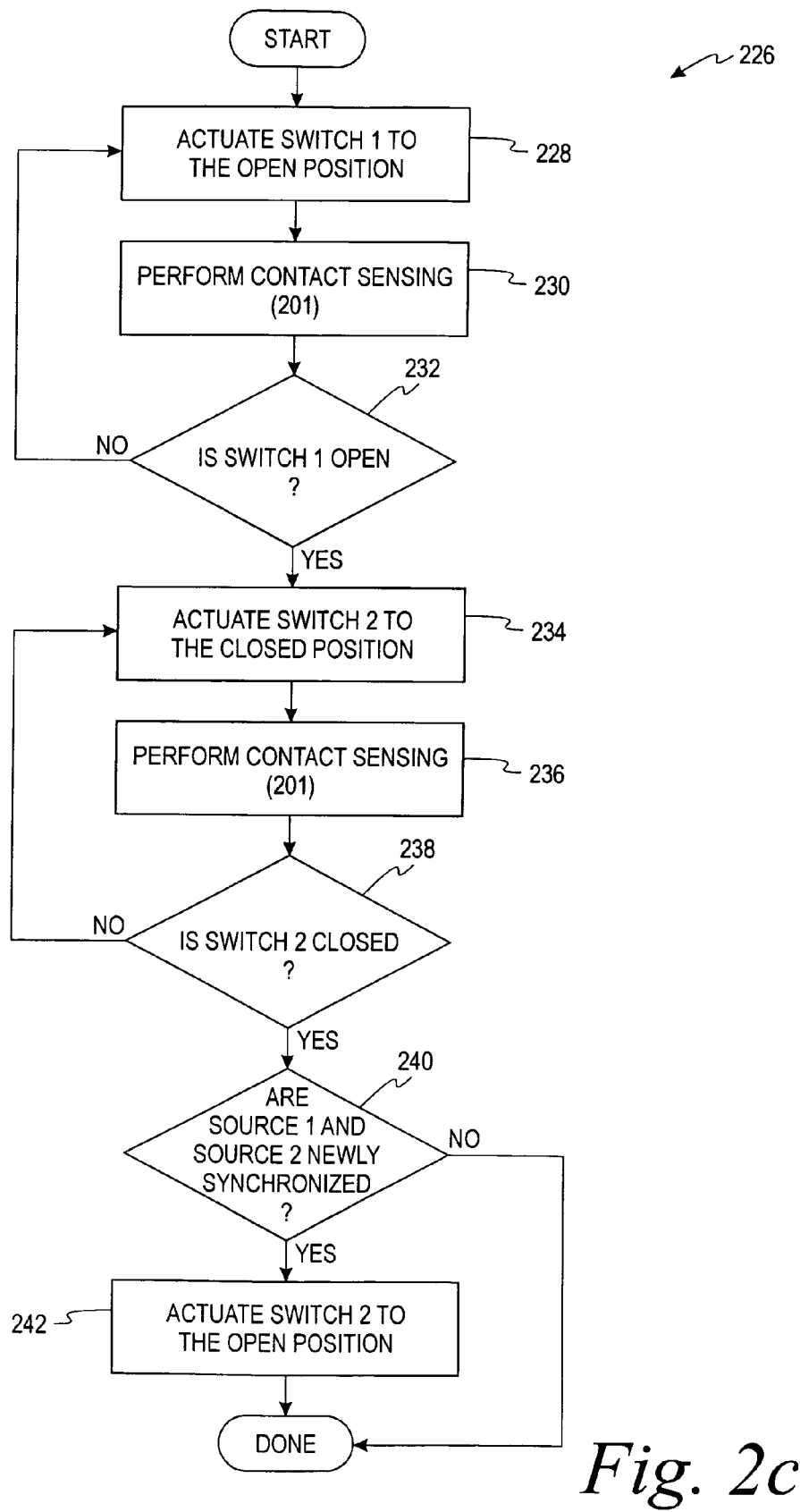
FIG. 2c is a flow chart diagram depicting a method of actuating the transfer switch mechanism using the contact verification method shown in FIG. 2b according to an aspect of the present invention.

FIG. 2c depicts a control algorithm 226 when switching switch 1 from closed to open and switch 2 from open to closed. The control algorithm 226 and associated data can be stored in memory 116. The control algorithm 226 instructs the transfer switch mechanism 102 (or circuit breaker or contactor, as the case may be) to actuate switch 1 to an open position (228). The contact sensing algorithm 201 is carried out (230), which is described above and is depicted in FIG. 2b. If the contact sensing algorithm 201 reports that switch 1 is not open, the control algorithm 226 causes switch 1 to be actuated to the open position (228).

If the contact sensing algorithm 201 reports that switch 1 is open (232), the controller circuit 114 instructs the transfer switch mechanism 102 to actuate switch 2 to the closed position (234). The contact sensing algorithm 201 is carried out (236), which is described above and is depicted in FIG. 2b. If the contact sensing algorithm 201 reports that switch 2 is not closed, the control algorithm 226 causes switch 2 to be actuated to the closed position (234).

By opening switch 1 and first verifying that its true state is open before allowing switch 2 to close, the control algorithm 226 prevents both sources 104, 106 from powering the load 108 or from shorting each other. Note that if it is desired to close switch 1, the control algorithm 226 first opens switch 2, performs the contact sensing algorithm 201 to verify that switch 2 is actually open, then closes switch 1 and performs the contact sensing algorithm 201 to verify that switch 1 is actually closed. If, after a predetermined number of attempts, the control algorithm 226 is unable to verify that a switch opened following an instruction to open that switch, the control algorithm 226 reports an error to the controller circuit 114, which can take corrective action such as reporting the error to the operator by visual or audible means, or opening all switches, or disabling the motor 118 of the transfer switch mechanism 102.

If the contact sensing algorithm 201 reports that switch 2 is actually closed (238), the algorithm 226 checks whether the sources 104, 106 are newly synchronized (240). This check is described above in connection with the contact sensing algorithm 201 (212), and is depicted in FIG. 2b. If the sources are newly synchronized, switch 2 is automatically actuated to the open position (242) to avoid backfeeding. If the sources are not newly synchronized (240), then the transfer switch algorithm 226 ends.

The electrical state of the contacts of a source switch that is determined from the values of the voltage characteristics is compared with the actuated state of the source switch. If the states are not consistent, then a contact verification error has occurred, whereupon the control algorithm 226 in the controller circuit 114 can take corrective action. In an aspect, the control algorithm 226 verifies that all source switches are open before allowing a new source switch to close during a power source transfer. The contact verification algorithm 201 verifies that the new source switch is closed, then checks that new source to verify that it is not back-feeding the old source.

As mentioned above, the contact verification algorithm 201 and the control algorithm 226 have been described in connection with a transfer switch implementation, but it is expressly understood that other implementations such as circuit breakers and contactors can also utilize the algorithms 201, 226 without departing from the present invention.

I. Back-EMF Voltage with Position Sensing

One of the three approaches discussed herein for estimating the motor phase (and thereby the distance traveled of its associated load), exploits the back electromotive force (EMF) voltage produced by the motor 118 as it rotates. The angle that the shaft of the DC motor 118 has turned is calculated based on the measured angle speed of the motor shaft. The travel distance can be calculated according to the following expression by integrating the angular speed of the DC motor 118 over time:

$$\varphi(\tau) = \int_0^\tau (\omega(t) + \varepsilon(t)) dt; \qquad \text{(Equation 1)}$$

where $\phi$ is the angle the motor turned (travel distance) since it started to move, $\omega(t)$ is an angular speed of the motor at time t, and $\epsilon(t)$ is an error of the speed measurements. Assuming a random and usually Gaussian distribution of the noise, the integral of Equation 1 reduces or even eventually eliminates noise.

Figure 3:
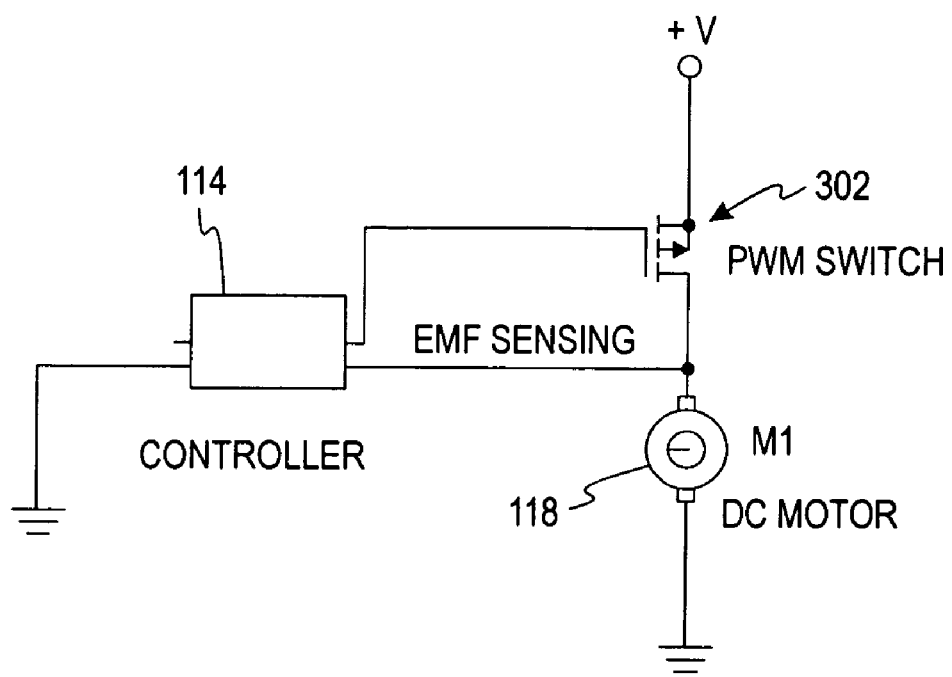
FIG. 3 is a functional diagram of a circuit capable of measuring back EMF voltage of a DC motor according to an embodiment of the present invention.
Figure 4:
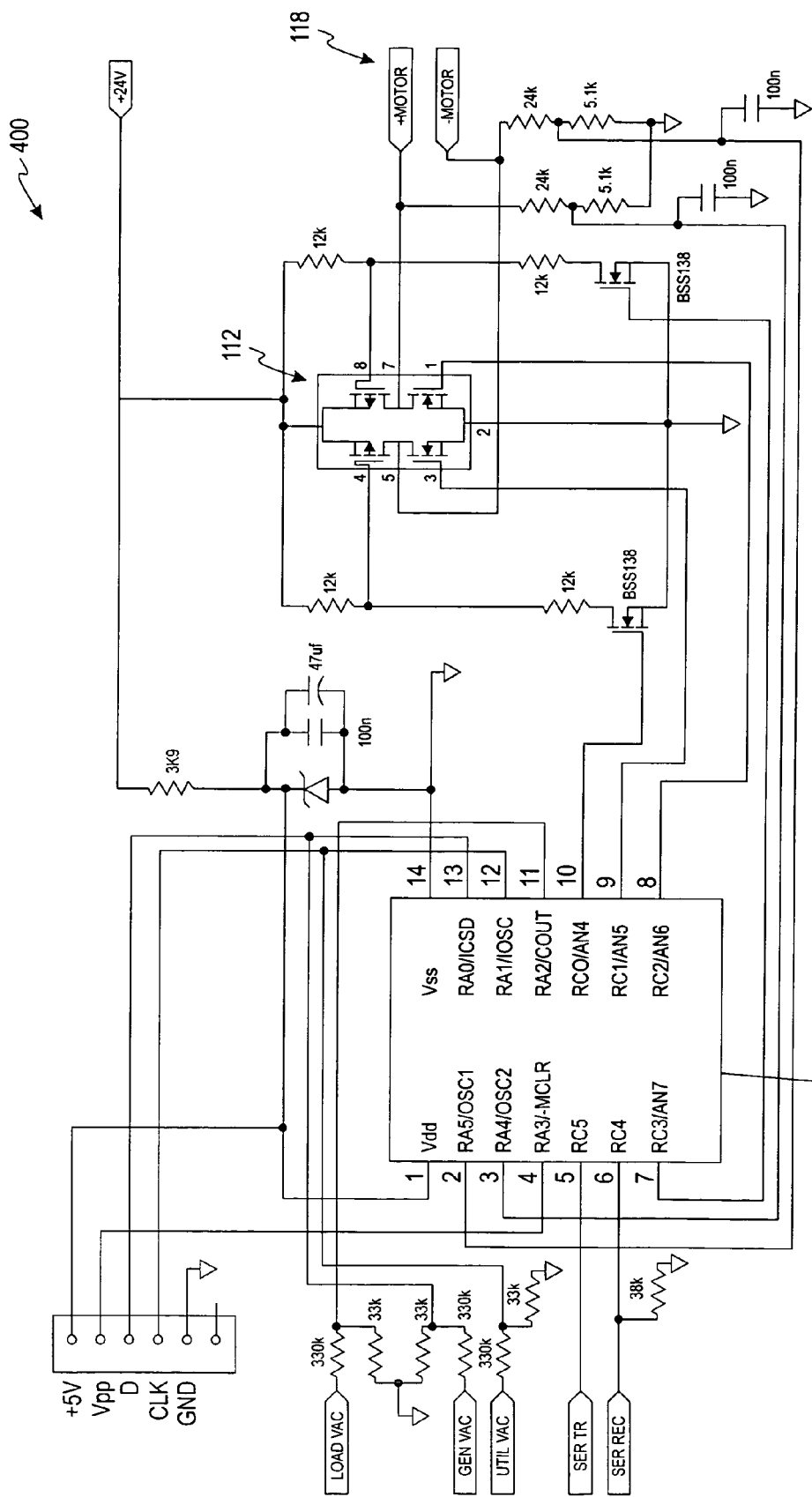
FIG. 4 is a schematic illustration of an exemplary circuit for calculating the travel distance of the motor by measuring the back EMF voltage according to a specific aspect of the present invention.

One approach of calculating the motor speed $\omega(t)$ measures the back electromotive force (EMF) voltage generated by the motor 118 when no voltage is applied to it for a short period of time. FIG. 3 is a functional diagram of a circuit capable of measuring back EMF voltage. The circuit includes a pulse width modulation (PWM) switch 302 that is connected between the DC motor 118 and the controller 114. It should be noted that the PWM switch 302 functionality can be incorporated on the same IC chip as the controller 114 (such as shown in FIG. 4). The PWM switch 302 applies (for approximately 100 ms) and removes current (for approximately 2-5 ms) to the DC motor 118, and the resulting EMF voltage when current is removed is sensed at the controller 114.

The DC motor 118 generates a back EMF voltage when its rotor spins, which is approximated by the following expression:

$$EMF = \alpha \cdot \omega \qquad \text{(Equation 2)}$$

where $\omega$ is a rotor speed, and $\alpha$ is a constant. Based on Equation 2, if power is removed for a short period of time (approximately 2-5 ms), and the voltage generated by the motor is measured during this time, the rotor speed can be calculated.

FIG. 4 is a schematic illustration of an exemplary circuit 400 for calculating the travel distance of the motor 118. The circuit includes the controller 114, which in this example is a PIC16F676 from Microchip Technology, Inc., based in Chandler, Ariz., and the motor driver 112, which in this example includes a complementary ZXMHC6A07T8 MOSFET H-bridge 112 available from Zetex Semiconductors based in Manchester, United Kingdom. Pins 7-10 (RC0-RC3) of the controller 114 are used to provide a PWM signal to the H-bridge 112. The PWM switch 302 is shown functionally in FIG. 3, though it should be understood that the PWM functionality is provided, in some embodiments, in the controller 114 via pins 7-10 (RC0-RC3). In other embodiments, an external PWM switch may be used.

The controller 114 receives EMF voltage during the time when the PWM switch 302 is opened for approximately 2-5 ms. During the rest of the cycle, for example, 100 ms, the motor 118 receives an amount of power as defined by the PWM switch 302. The controller 114 monitors the state and the conditions of the switch, determines whether it is necessary to move the transfer switch mechanism 102 from one position to another, and controls the speed of the motor 118 and the distance (angle) that the motor 118 should turn during operation. The controller 114 also detects a locked condition of the mechanism, which can happen because of a manual operation or as a result of a circuit breaker trip when the transfer switch mechanism 102 is not allowed to operate under remote (motor) control. The locked state is required by safety considerations, so the present invention is capable of detecting when the motor 118 is in a locked position as well. These aspects are explained more fully below.

The algorithm according to an aspect of the present invention not only determines motor speed, but also determines the position of the motor. To do so, according to an aspect, the controller 114 compares the instant voltage at the output and at both inputs of the transfer switch mechanism 102 using the phase comparators 120, 122. For example, if there is a voltage at the output (load side) and only one of the inputs (for example, utility power source), the position of the transfer switch mechanism 102 is in a utility position. If a voltage is detected at both inputs, a correlation of the output AC voltage and input voltages reveals the position of the transfer switch mechanism 102. A closer correlation between the output voltage and one of the input voltages shows which contacts are connected. If there is no output voltage, the transfer switch mechanism 102 could be in an intermediate (middle) position or at a utility or backup position with no voltage. For example, the transfer switch mechanism 102 could be connected to the utility power source 102, which is offline, causing no voltage to be detected at the input or output of the transfer switch mechanism 102. Without more information, the controller 114 cannot determine the actual position of the transfer switch mechanism 102. To determine the position of the switch, an implementation of the present invention moves the motor slowly while closely monitoring the speed of the transfer switch mechanism 102. A sudden stop of the transfer switch mechanism 102 serves as an indication that a terminus point has been reached. The slow movement of the motor 118 reduces the dynamic load on the transfer switch mechanism 102 and prevents damage to it and to the gearbox or motor mounts.

Figure 5:
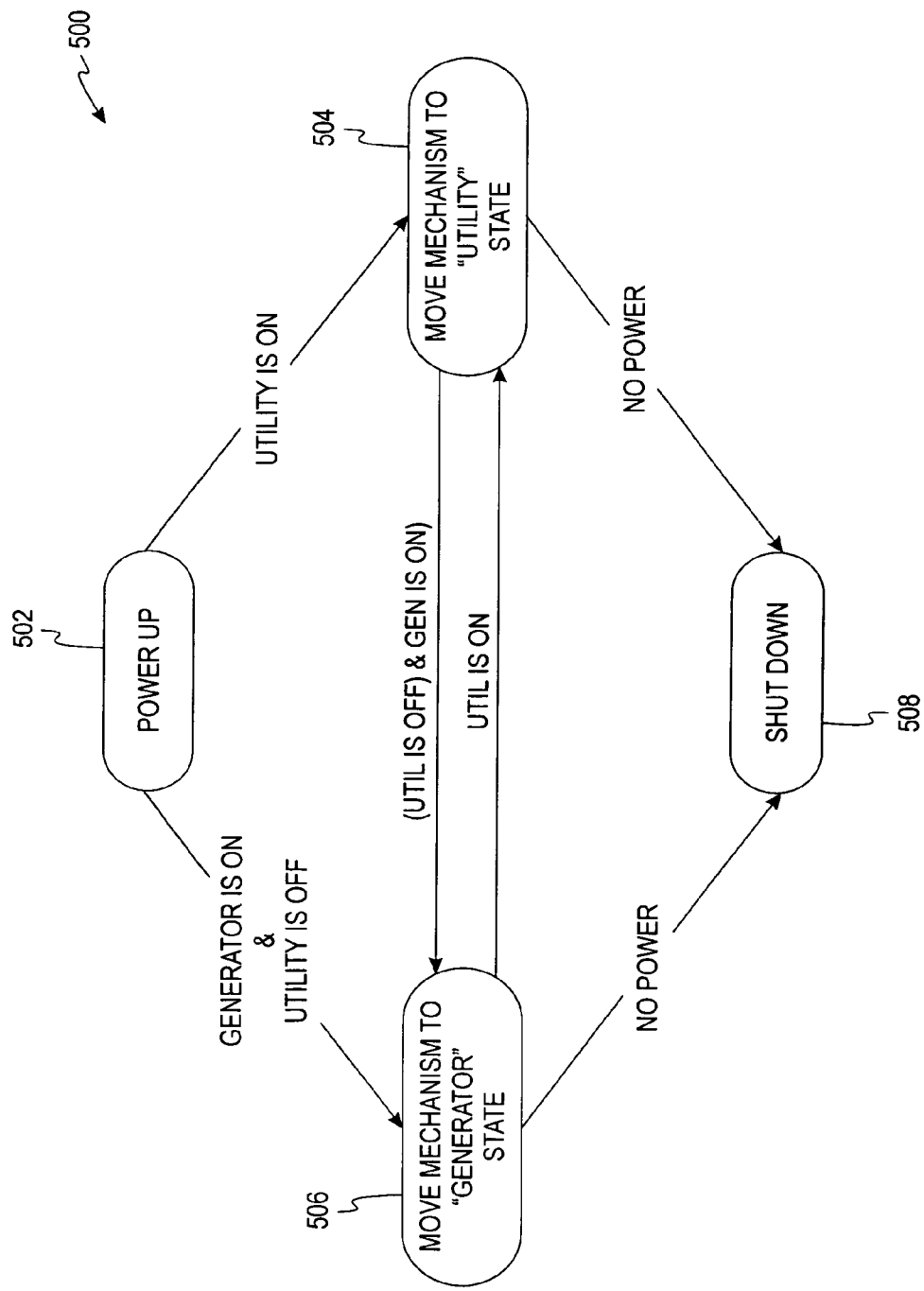
FIG. 5 is a state diagram for controlling the state of a transfer switch mechanism according to an aspect of the present invention.

FIG. 5 is a state diagram 500 executed by the controller 114 according to an aspect of the present invention. The system 100 switches the load 108 from the utility power source 104 to the backup power source 106 if the utility power source 104 has failed. When the transfer switch mechanism 102 loses power and then receives power back, the state machine 500 starts from a POWER UP state 502. If the utility power source 104 is ON, the state machine 500 moves to the UTILITY state 504, which causes the transfer switch mechanism 102 to move to the utility position. From the POWER UP state 502, if the backup power source 106 is ON and the utility power source 104 is OFF, the state machine 500 moves to the GENERATOR state 506, which causes the transfer switch mechanism 102 to move to the backup position. If the UTILITY or GENERATOR states sense no power, then the state machine 500 moves to a SHUTDOWN state 508. If the state machine 500 is in the UTILITY state 504 and utility power is lost and there is backup power, the state machine 500 moves to the GENERATOR state 506. From the GENERATOR state 506, if utility power is restored, the state machine 500 moves to the UTLITY state 504. In both the UTILITY and GENERATOR states 504, 506, the controller 114 detects the present position of the transfer switch mechanism 102, provides the necessary operations to move the transfer switch mechanism 102 to the required direction, if necessary, and maintains this position until the state changes.

After entering the POWER UP state 502, the controller 114 needs to determine the position of the transfer switch mechanism 102, which can be in a UTILITY, GENERATOR, MIDDLE, or LOCKED position. To do so, the system 100 monitors the voltage at the probes 130, 132, and 134 (shown in FIG. 1), to determine which power source is active. Presence of a voltage at the probes 130 or 132 indicates that the utility power source 104 or the backup power source 106 is active. If the probe 134 reports a voltage on the load 108 side of the transfer switch mechanism 102, the system 100 knows the position of the transfer switch mechanism. For example, if a voltage is present on the probes 130 and 134 only (and not on the probe 132), the controller 114 assumes that the transfer switch mechanism 102 is in a UTILITY position, i.e., switched to allow electrical current to flow between the utility power source 104 and the load 108. If voltage is detected on both sources 104, 106, a comparison of the phases on the load 108 side and at each of the power source 104, 106 sides for a few cycles via the phase comparators 120, 122 provides enough data for the controller 114 to detect the position of the transfer switch mechanism 102. The detection is based on the phase and/or frequency difference between the voltage on the conductors leading to the backup power source 106 and the utility power source 104. When the switch contacts of the transfer switch mechanism are closed, the phases of the voltages at both sides of the closed contacts are exactly the same, while a phase shift between opened contacts is different. Typically, the utility power source 104 and the backup power source 106 will not be synchronized with one another, allowing the controller 114 to make assumptions about phase differences of the voltages on the probes 130, 132.

Figure 6:
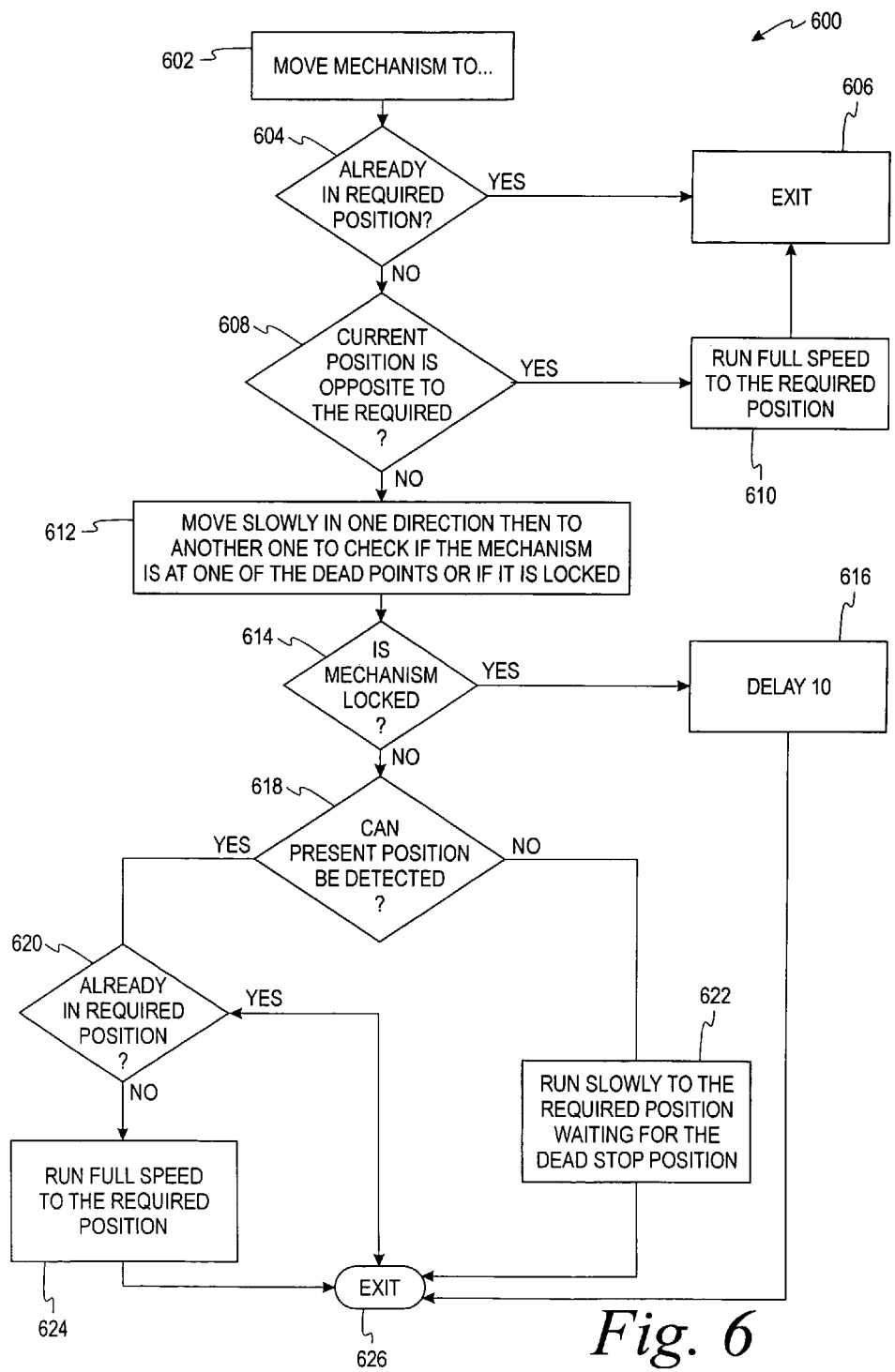
FIG. 6 is a flow chart diagram of an activate-mechanism algorithm for moving the transfer switch mechanism from one of a UTILITY, GENERATOR, MIDDLE, or LOCKED position to another according to an aspect of the present invention.

FIG. 6 is a flow chart diagram of an activate-mechanism algorithm 600 for moving the transfer switch mechanism 102 from one position to another, such as between any of the UTILITY, GENERATOR, MIDDLE, or LOCKED positions according to an aspect of the present invention. Key aspects of the algorithm 600 include the following. The controller 114 can move the transfer switch mechanism 102 to a desired direction with a desired speed (using the driver 112). The speed of the motor is measured constantly by the controller 114 in accordance with the algorithms described above, so the driver 112 provides a way of adjusting the speed if necessary in conjunction with the PWM switch 302. Because the controller 114 measures the speed of the DC motor 118, it can detect whether the transfer switch mechanism reaches a terminus point or dead stopping point. The controller 114 can run the motor 118 according to a motion profile that includes three movements. First, the controller 114 slowly rotates the motor in a direction opposite the desired direction to compensate for possible shifting after the last operation. Second, the motor 118 moves the transfer switch mechanism 102 as fast as possible at or near full speed at a distance of approximately 95% of the full travel distance. Third, the controller 114 continues to move the motor 118 slowly at about 10% of full speed until the terminus or stopping point is reached. Accordingly, the motor 118 moves through the heaviest load zones quickly, then coasts to a stop near the end point of the travel distance to avoid breaking any components in the motor or in the circuit breaker. The algorithm also provides assurance that the transfer switch mechanism 102 has completed the transition and is located precisely at the desired position.

The algorithm 600 receives a request to move the transfer switch mechanism 102 to a desired position (602), and then checks whether the transfer switch mechanism 102 is in that desired position (604). If so, the algorithm 600 exits (606). If not, the algorithm 600 checks whether the present position of the transfer switch mechanism 102 is opposite to the desired position (608). If so, the algorithm 600 runs the motor 118 at full speed according to the motion profile described above to the desired position, coasting, as discussed above, when the transfer switch mechanism 102 reaches the desired position (610). If the present position is not opposite to the desired position, the algorithm 600 causes the motor 118 to move slowly in one direction and then in the other direction to determine whether the transfer switch mechanism 102 is at one of the terminus points or is in a LOCKED position (612). The algorithm 600 determines whether the transfer switch mechanism 102 is locked (614), and if so, issues a brief delay of about 10 seconds (616) before exiting (626). Note that the delay period is optional and can be longer or shorter than 10 seconds, and merely causes the algorithm 600 to wait for a specified period of time before checking again whether the transfer switch mechanism 102 is still locked. If the transfer switch mechanism 102 is not locked, the algorithm 618 determines whether the present position of the transfer switch mechanism 102 can be detected (618). If so, the algorithm 600 determines whether the mechanism 102 is already in the desired position (620). If so, the algorithm 600 exits (626); if not, the algorithm 600 runs the motor 118 at full speed according to the motion profile set forth above to is the desired position (624) before exiting (626). If the algorithm cannot detect the present position of the mechanism 102 (614), the algorithm 600 runs the motor 118 slowly to the desired position until a terminus point is reached (622), and then exits (626).

Figure 7:
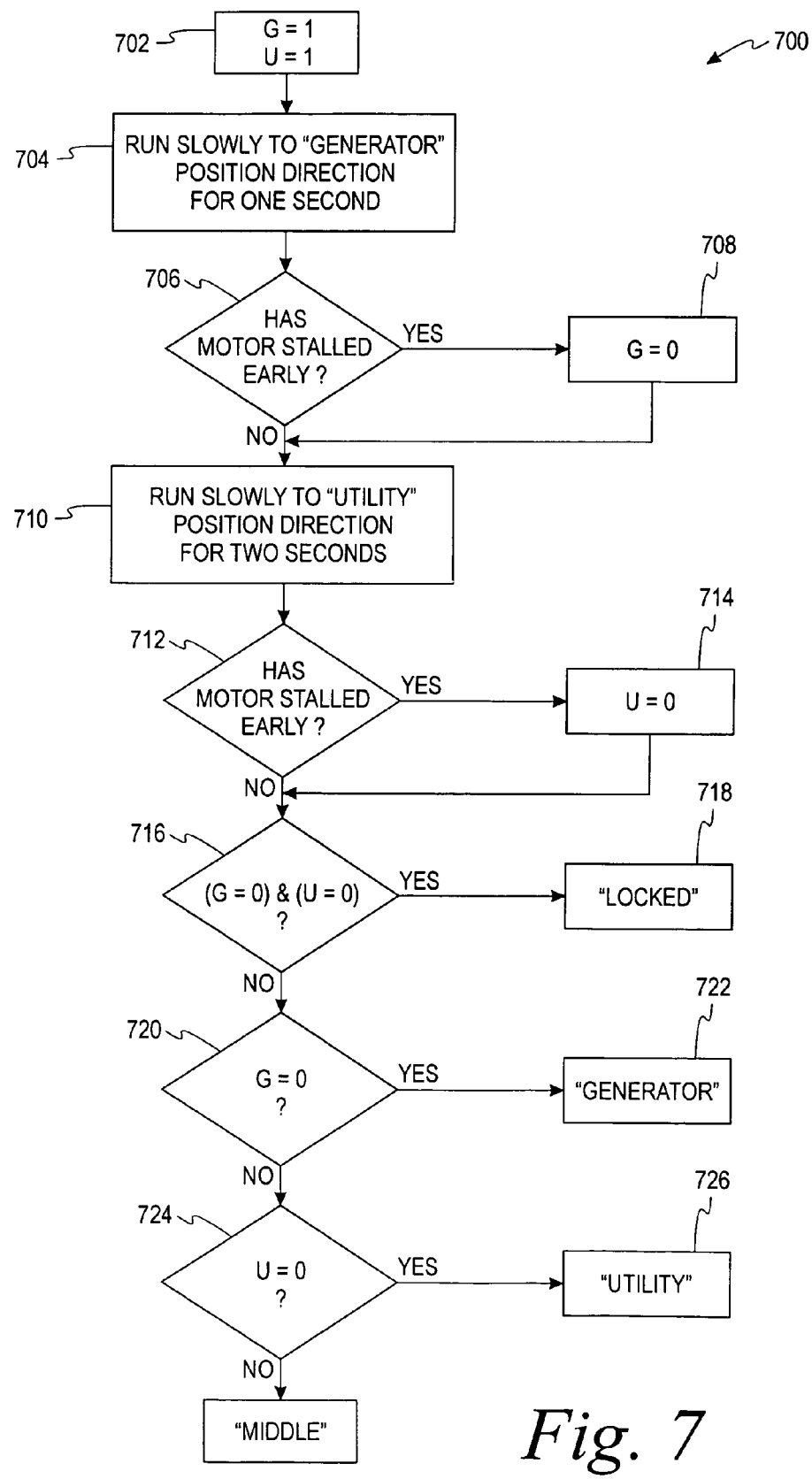
FIG. 7 is a flow chart of a position-detection algorithm according to an aspect of the present invention.

As mentioned above, to determine whether the transfer switch mechanism 102 is restricted in moving in one direction or another, the controller 114 tests for a restriction by running the motor 118 slowly in each direction for a second or two, returning each time to its starting point while measuring the speed of the motor 118. FIG. 7 is a flow chart of a position-detection algorithm 700 according to an aspect of the present invention. The algorithm 700 initializes two variables, G (for generator) and U (for utility) to a value of 1 (702). The algorithm 700 runs the motor 118 slowly in a direction toward the GENERATOR position for one second (704), and determines whether the motor 118 has stalled early (706). If so, G=0, and the algorithm 700 runs the motor 118 slowly in a direction toward the UTILITY position for two seconds (710). The algorithm 700 determines whether the motor 118 has stalled early again (712). If so, U=0, and the algorithm 700 determines whether G=U=0. If so, the algorithm 700 stores an indication that the transfer switch mechanism 102 is in a LOCKED position (718). The algorithm 700 tests whether G=0, and if so, it stores an indication that the transfer switch mechanism 102 is in a GENERATOR position (722). If G is not equal to 0, the algorithm 700 checks whether U=0 (724), and, if so, stores an indication that the transfer switch mechanism 102 is in a UTILITY position (726). If neither G nor U is equal to 0, then the algorithm 700 stores an indication that the transfer switch mechanism 102 is in a MIDDLE position. In this intermediate position, the transfer switch mechanism 102 is free to move but its switch is not connected to the utility power source 104 or to the backup power source 106.

Figure 8:
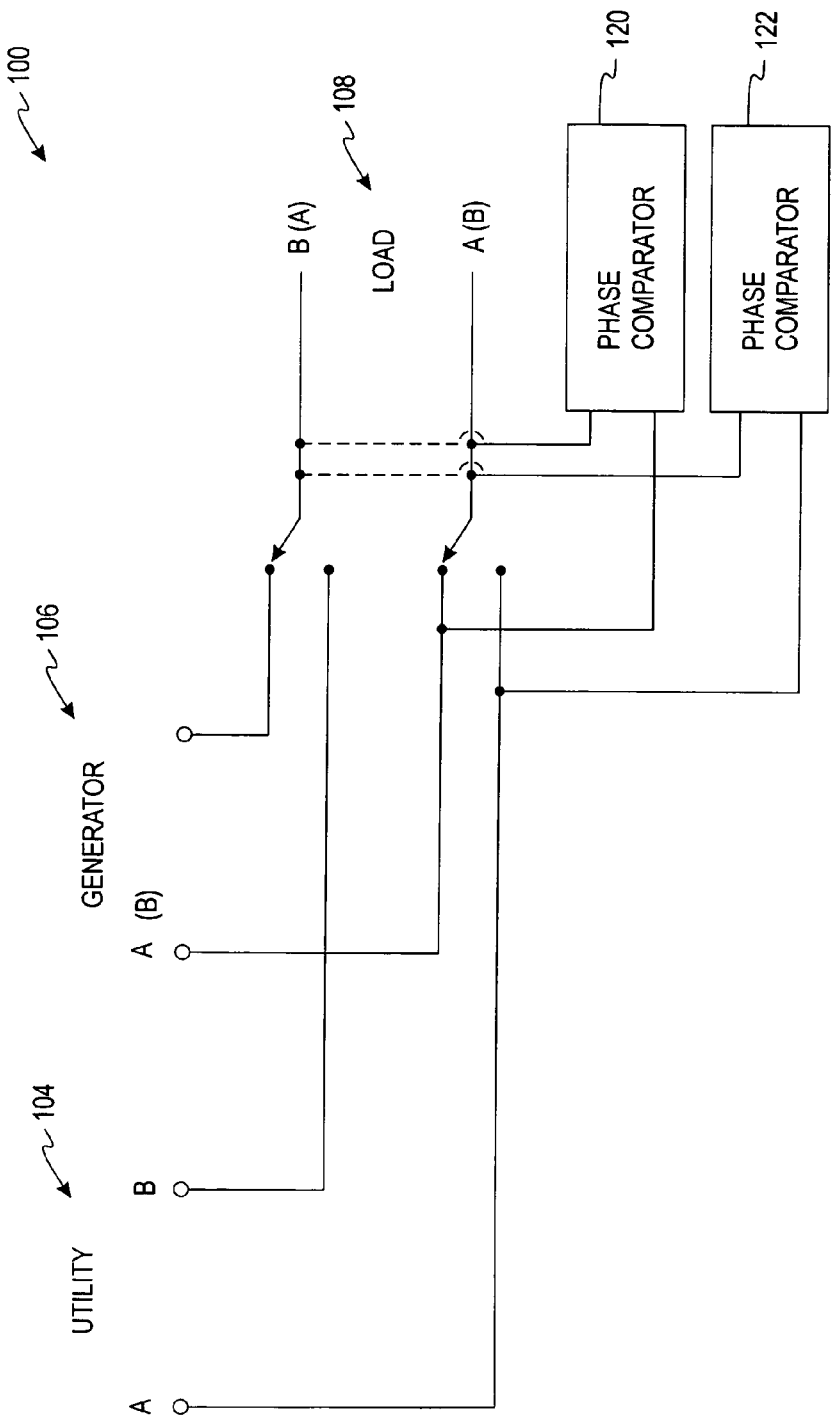
FIG. 8 is a functional circuit diagram of a system for comparing the phases of the voltages on the line and load sides of a transfer switch mechanism according to an aspect of the present invention.
Figure 9:
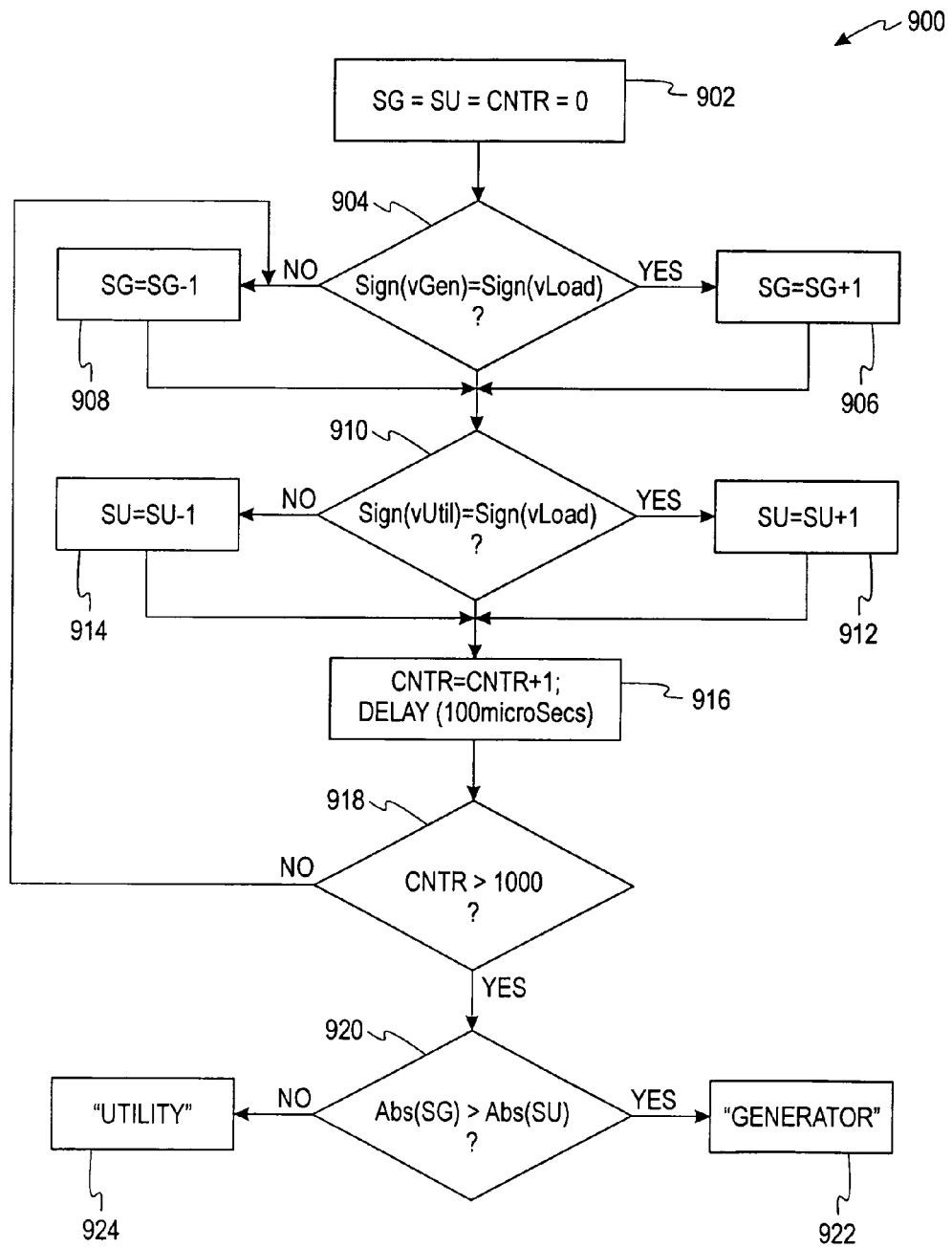
FIG. 9 is a flow chart of a phase-detection algorithm that is independent of a 180-degree phase shift according to an aspect of the present invention.

To test which part of the transfer switch mechanism 102 is closed, the phase difference in the AC voltage between the load 108 side and the source sides 104, 106 are compared. The phase of the AC voltage on the respective sides of a closed contact pair will be the same or opposite (0 or 180 degrees). FIG. 9 is a flow chart of a phase-detection algorithm 900 that is independent of a 180-degree phase shift. For example, phase A at the load 108 side and phase B at the utility 104 side may be connected as shown in FIG. 8. Regardless of whether the operator connects the load to phase A(B) or B(A) (shown by the dashed lines), the phase-detection algorithm 900 can still determine the position of the transfer switch mechanism 102 even in the event of a mis-wiring.

The algorithm 900 starts by zeroing several variables: SG, SU, and CNTR. The SG variable is used for counting the number of times that the generator is detected as being active, while the SU variable is used for counting the number of times that the utility power source is detected as being active, as described below in connection with the flow chart of FIG. 9. The voltages on the sources 104, 106 and load 108 are detected by the probes 130, 132, 134

The sign of the voltage phase of the backup power source 106 ($V_{GEN}$) is compared to the sign of the voltage phase of the load 108 ($V_{LOAD}$) (904). If the signs are equal, the SG counter is incremented (906); otherwise it is decremented (908). The sign of the voltage phase of the utility power source 106 ($V_{UTIL}$) is compared to the sign of the voltage phase of the load 108 ($V_{LOAD}$) (910). If the signs are equal, the SU counter is incremented (912); otherwise it is decremented (914). The CNTR counter is incremented followed by a brief delay of 100 microseconds (916) to allow a sufficient number of cycles to occur. In other embodiments, the delay can be shorter or longer. The algorithm 900 determines whether CNTR exceeds a predetermined number of values, here 1000 (918), and the loop is continued until the CNTR exceeds 1000. Other values can be selected in other embodiments. The value 1000 was selected to achieve more precise phase matching. The absolute value of SG is compared to the absolute value of SU (920). In this manner, the phase-detection algorithm 900 is independent of a 180 degree phase shift, and can detect source connections even if a wiring error is present. If the absolute value of SG is greater than the absolute value of SU, then the algorithm returns the position of the transfer switch mechanism 102 as in the GENERATOR position (922); otherwise it returns the position as in the UTILITY position (924).

It should be understood that the foregoing algorithms 600, 700, 900 continuously determines the motor travel distance by measuring the back EMF voltage of the motor 118 while using PWM modulation to control its speed. The position of the transfer switch mechanism 102 is also automatically determined according to aspects of the present invention (including any described below), and this combination of automatic speed sensing and position sensing eliminates any need for external limit switches or sensors to accomplish these purposes.

II. Adaptive Filtering with Complex Single Frequency PLL Approach

A second approach for estimating motor phase implements a complex single frequency (CSF) phase-locked loop that estimates a speed-related harmonic frequency (such as the fundamental frequency) of the DC motor (independent of the load applied) as a function of time, which is used to determine the motor speed in revolutions per minute along with known geometry parameters of the DC motor. The current of the DC motor includes the speed-related harmonic with a time-varying instantaneous frequency and unknown, possibly time-varying magnitude and phase. Accurate estimation of the phase of a brushed DC motor under variable load conditions, or, equivalently, dynamically estimating position of an attached mechanical apparatus, offer advantages in automatic transfer switch environments that would otherwise require limit switches to determine the position of the transfer switch mechanism. Under this approach, a CSF PLL algorithm is proposed to determine the instantaneous frequency or phase of the DC motor 118, independent of the load applied. By integrating its phase (rotor speed), or simply counting fundamental periods of the motor's rotation, the instantaneous motor speed or correspondingly the position of the mechanical load can be estimated with sufficient accuracy to eliminate any need for limit switches to define the terminus points for load traversal. It also does not require computationally expensive algorithms that convert the current waveform into the frequency domain by using Fourier transforms. The CSF PLL component includes a CSF adaptive filter, employed as a phase discriminator, combined with an efficient instantaneous frequency adaptation method. Advantages of the CSF PLL include simplicity, efficiency, accuracy, and a computational complexity that can be scaled by appropriately selecting from simplified means of adaptation, or filter operation, associated with the same architecture.

Two specific architectural implementations of a CSF PLL 1006 will be described herein, functionally illustrated in FIGS. 14b (architecture type 0) and 14c (architecture type I) and described below.

A conventional CSF adaptive filter assumes a stationary or static incident frequency, $f_n$, but the fundamental speed-related frequency of the motor 118 can be dynamic, varying from, for example, 440-500 Hz in an exemplary case, depending upon the load. A larger load decreases the motor's RPM output, thereby decreasing its fundamental frequency. The presence of this dynamic frequency in the system 100 calls for an adaptation of the incident frequency as well as magnitude and phase. Because a conventional CSF adaptive filter assumes a stationary (or quasi-stationary) incident frequency, what is proposed herein is an adaptive filter with a PLL structure that iteratively adapts a dynamic incident frequency. CSF adaptive filters can match the frequency of a primary signal component to compensate for a residual frequency between the incident signal and a single-frequency component of interest in the primary signal, but only for a small residual frequency. The adaptive process of minimization of error in a mean squared sense causes the adaptive coefficient to converge upon a dynamic solution, effectively modulating the incident signal at a rate equal to the residual frequency. Dynamic convergence is possible with a CSF filter only if the residual frequency is small and slow-changing relative to the rate of adaptation, µ. While a conventional CSF filter can tolerate small and slow-changing variations in the incident frequency, the fundamental frequency of a loaded motor can change faster than the CSF filter is able to modulate. Thus, it is not desirable to use a CSF filter to estimate the phase of the DC motor 118 when connected to a dynamic load (e.g., circuit breaker switches) because the fundamental frequency of the motor 118 dynamically varies over time.

The DC motor 118 is supplied a 24V potential across two connections that directly control the speed of the motor 118, and its torque, or ability to drive the asymmetric transfer switch mechanism 102 and breaker load. The integrated H-bridge motor controller 112 controls the DC motor 118 from two PWM inputs driven by a DSP, where the lead driven and duty cycle affect DC motor control.

Figure 10A:
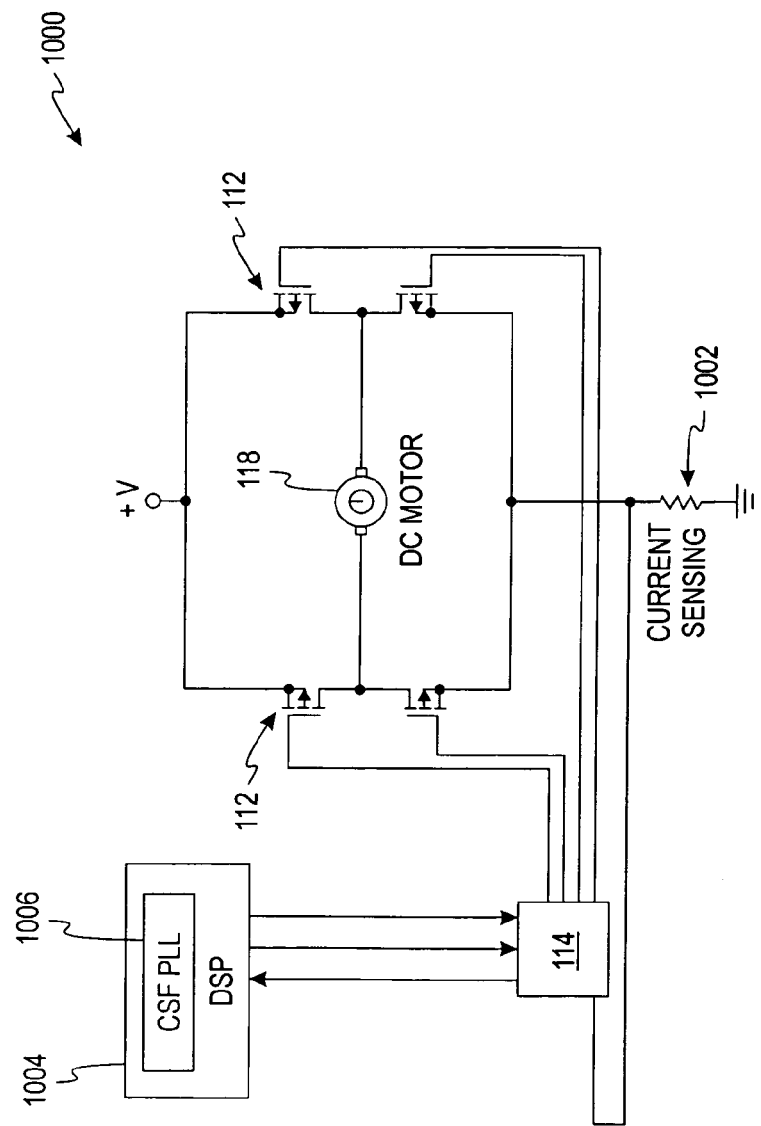
FIG. 10a is a functional block diagram of a system incorporating a complex single frequency phase-lock loop in a digital signal processor according to an aspect of the present invention.

FIG. 10a is a functional block diagram of a system 1000 incorporating a CSF PLL 1006 in a digital signal processor (DSP) 1004 according to an aspect of the present invention. The controller 114 includes an input 1008 that receives a current signal proportional to the input current signal to the motor 118 (a resistor 1002 divides the voltage to a level suitable for the controller 114). The DSP 1004 can be disposed on the same IC as the controller 114 or on separate ICs.

A feedback mechanism is required to determine DC motor phase, and relative position. Several options exist for selection of an appropriate current measurement reflecting the DC motor current. An indirect measurement provided by the integrated motor controller of high-side current was selected due to advantages in accessibility and power consumption.

The states of the main and auxiliary supplies are provided through isolated sensors located upstream from their respective breakers as described above. State information provides the stimulus for control, or activation of the transfer switch.

The advantages provided by this algorithm include reduced complexity and cost. The phase-estimation algorithm is not computationally complex, and may readily be integrated into the existing motor controller, and, importantly, limit switches are not required.

The internal geometry of the DC motor 118 provides an opportunity for phase estimation. The DC motor 118 (shown in FIG. 10b) has P poles 1010a,b,c and C contacts 1012a,b, with an internal gear that divides the motor rotational speed by a factor of G 1014 relative to the external shaft rotation, specified as R revolutions per minute.

The dynamic connections between the brush contacts and the poles of the motor 118 synthesize a frequency that is directly proportional to the rotational speed R of the DC motor 118. The motor manufacturer will generally specify the number of poles P 1010a,b,c and brushes C 1012a,b, as well as any internal gear ratio G 1014, if applicable. These parameters, P, C, and G are referred to as geometry parameters of the DC motor 118, and are either known a priori or can be determined when the DC motor 118 is placed under stationary load conditions. Maximum and minimum rotational speeds, R, corresponding to unloaded and full load conditions, and the current drawn at rotor lock are also typically supplied. Examination of the motor current under a set of stationary load conditions can reveal any missing information regarding DC motor 118 specifications.

It is desired to calculate the range of fundamental frequencies expected to be induced in the DC motor current, due to the geometry of the motor 118 and its load. The frequency of the motor 118 is given by the following expression:

$$f_{motor} = \frac{RGCP}{60} \quad \text{(Equation 3)}$$

Thus, the motor speed, R, at any given time when the motor 118 is under load, is unknown, but can be solved for if $f_{motor}$ is determined. As shaft rotation speed of the motor 118 is load dependent, with a stationary supply voltage, so too is the synthesized frequency of interest. Appropriate sampling rates and anti-aliasing filter design parameters must account for the highest fundamental frequency that will be seen in a specific unloaded DC motor system. In an exemplary embodiment, the DC motor 118 has 3 poles, 2 contacts, a 200:1 gear ratio, and a manufacturer's rated speed range over full load and unloaded conditions at 22 rpm and 25 rpm, respectively. The fundamental frequency in this system will therefore be found in the range of 440-500 Hz. If the supply voltage to the DC motor 118 is reduced, the rotational speed of the motor 118 and the fundamental frequency synthesized in the motor current, will also decrease. By estimating the instantaneous rotational speed of the motor 118, its motor speed can be calculated from the frequency expression given by Equation 3 above.

If both a stationary supply voltage and load environment could be guaranteed, motor speed would be known and constant, and the phase estimation, or distance of mechanical travel in the load, could be simply estimated with a timer. This ideal environment is quite uncommon. In a transfer switch environment, the load on the motor varies as the transfer switch mechanism traverses from one position to another, causing the speed of the motor to vary.

The transfer switch mechanism 102 operates within a non-stationary load environment, as the load resistance changes in a position-dependent manner along the travel from one end position to the other. Further, the load pattern is asymmetric, as the breakers to which the transfer switch mechanism 102 are coupled provide different resistances and tolerances between breakers, or over extended periods of use, may differ considerably.

Aspects of this CSF PLL approach require a system that will accurately estimate motor phase in non-stationary and asymmetric load environments, even environments whose load profiles are dynamic. The algorithm also eliminates any learning period, and performs the task by monitoring the motor current. Further, the algorithm is a computationally inexpensive algorithm that may readily be integrated into a DSP.

Extraction of the DC and AC components of the DC motor current is accomplished by an adaptive complex single frequency (CSF) filter, iterating at the sampling rate. CSF adaptive filters are architecturally simple digital filters that include a single complex time-varying coefficient, complex exponential synthesis and a narrow signal interface. CSF adaptive filters have compact support, which suggests a computationally efficient implementation, inherent stability and applicability of a diverse set of adaptive algorithms.

Figure 11A:
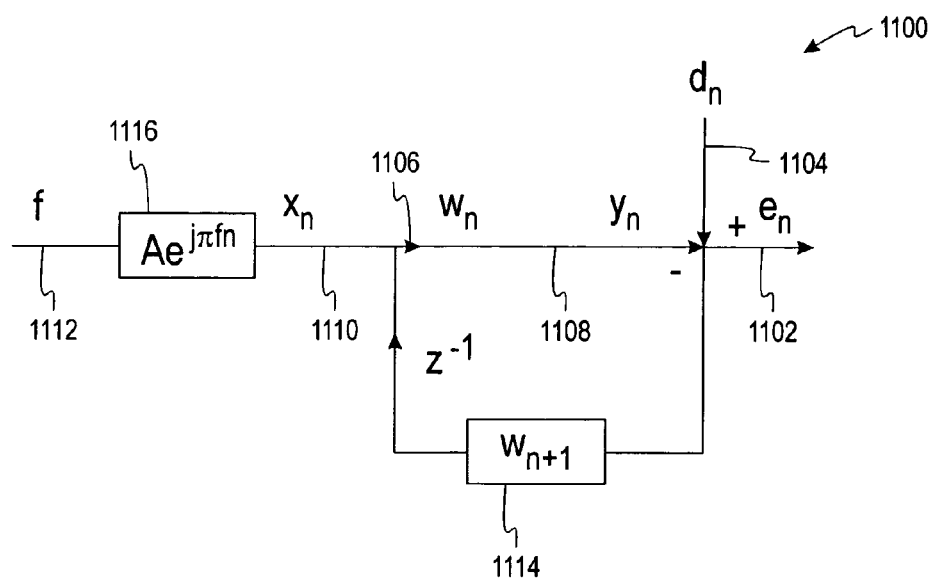
FIG. 11a is an illustration of a complex single frequency adaptive filter architecture.

FIG. 11a is an illustration of a prior-art CSF adaptive filter architecture 1100 having an error signal 1102, $e_n$, a (complex) primary signal 1104, $d_n$, an adaptive (complex) coefficient 1106, $w_n$, a reference signal 1108, $y_n$, an incident signal 1110, $x_n$, and a stationary incident frequency 1112, f. The reference signal 1108 is the product of the incident signal 1110 and the adaptive coefficient 1106:

$$y_n = x_n w_n$$

The error signal 1102 is the difference between the primary signal 1104 and the reference signal 1108:

$$e_n = d_n - y_n$$

Preferably, the complex form of the CSF filter 1100 is employed, so the adaptive coefficient w and the primary signal d are in complex form. The complex form of the adaptive coefficient w is referred to herein as a complex coefficient.

The CSF filter 1100 includes a coefficient adaptation component 1114 where the magnitude and phase of the unknown signal are adapted to match the magnitude and phase of the primary signal 1104. A complex exponential 1116 is synthesized with the incident frequency 1112 to produce the incident signal 1110.

Figure 11B:
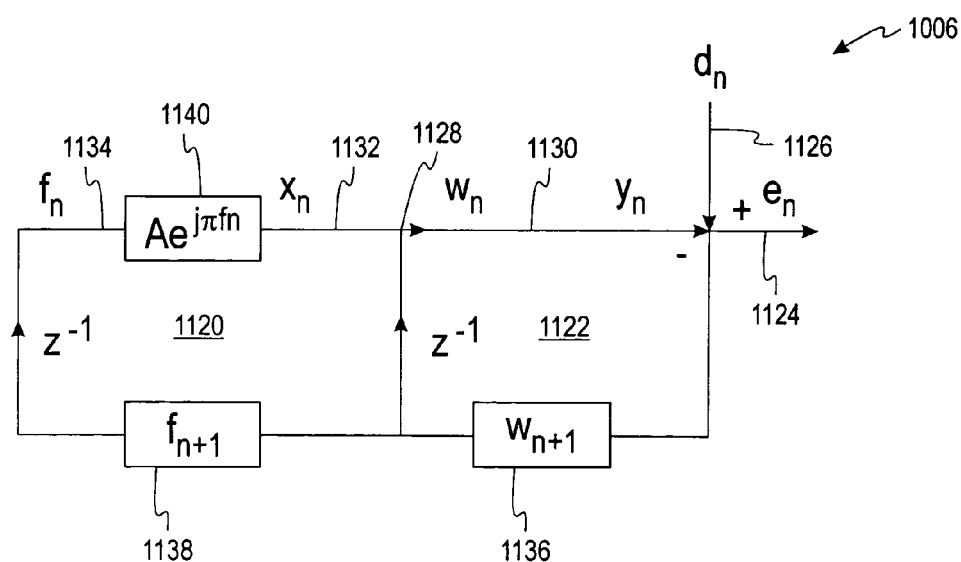
FIG. 11b is an illustration of the architecture of a complex single frequency phase-lock loop algorithm having a CSF PLL component according to an aspect of the present invention.

FIG. 11b is an illustration of a general architecture of the CSF PLL algorithm 1006 having a CSF PLL component 1120 according to an aspect of the present invention. The CSF PLL component 1120 is coupled to a CSF filter 1122 such as the one shown in FIG. 11a. Like the CSF filter 1100, the CSF PLL 1006 includes an error signal 1124, $e_n$, a (complex) primary signal 1126, $d_n$, an adaptive (complex) coefficient 1128, $w_n$, a reference signal 1130, $y_n$, an incident signal 1132, $x_n$, and a dynamic incident frequency 1134, $f_n$. The CSF filter 1122 includes a coefficient adaptation component 1136 where the magnitude and phase of the unknown signal are adapted to match the magnitude and phase of the primary signal 1126. The CSF PLL component 1120 includes an incident frequency adaptation component 1138, which predicts a time-varying instantaneous frequency of a component of interest (such as the fundamental frequency) in the primary signal 1126. A complex exponential 1140 is synthesized with the incident frequency 1134 to produce the incident signal 1132. An important difference between the architectures shown in FIGS. 11a and 11b is that the frequency of the incident signal is stationary in a CSF adaptive filter 1100, but dynamic (time-varying) and adaptively derived from a single-frequency primary signal component in the CSF PLL 1006.

Various adaptive algorithms discussed below that utilize LMS and RLS methods can be employed to iteratively adapt the adaptive coefficient 1106, with a common goal of minimizing estimation error in a mean squared sense. A local synthesized complex exponential signal 1116 is incident on the adaptive coefficient 1106. Iterative adaptation of the adaptive coefficient 1106 scales, phase shifts, and modulates the adaptive coefficient 1106 until the resulting reference signal 1108 estimates a stationary component of the external primary signal 1104. When the estimation is optimal, adaptation converges about a statistically bounded solution. Least Mean Square (LMS) adaptation employs a noisy, but statistically unbiased, gradient estimate, based upon instantaneous error. While computationally simple, unity memory depth slows LMS convergence and increases misadjustment.

The CSF filter according to an embodiment utilizes simple Normalized Least Mean Squared (NLMS) adaptation of the coefficient, with a fixed rate of adaptation. The pertinent equations for isolating the DC component of the motor signal are provided below. The CSF filter is employed as a notch filter to remove the DC component (k is the sample time). The derivations of the gradient are provided in more detail below.

$$e_k = d_k - \omega_{DC,k}$$

$$\tilde{\nabla}_{DC,k} = \frac{\partial}{\partial w_{DC}} e_k^* e_k = -2e_k$$

$$\omega_{DC,k+1} = \omega_{DC,k} - \mu_{DC}\tilde{\nabla}_{DC,k} = \omega_{DC,k} + 2\mu_{DC}e_k$$

Figures 10B, 10C:
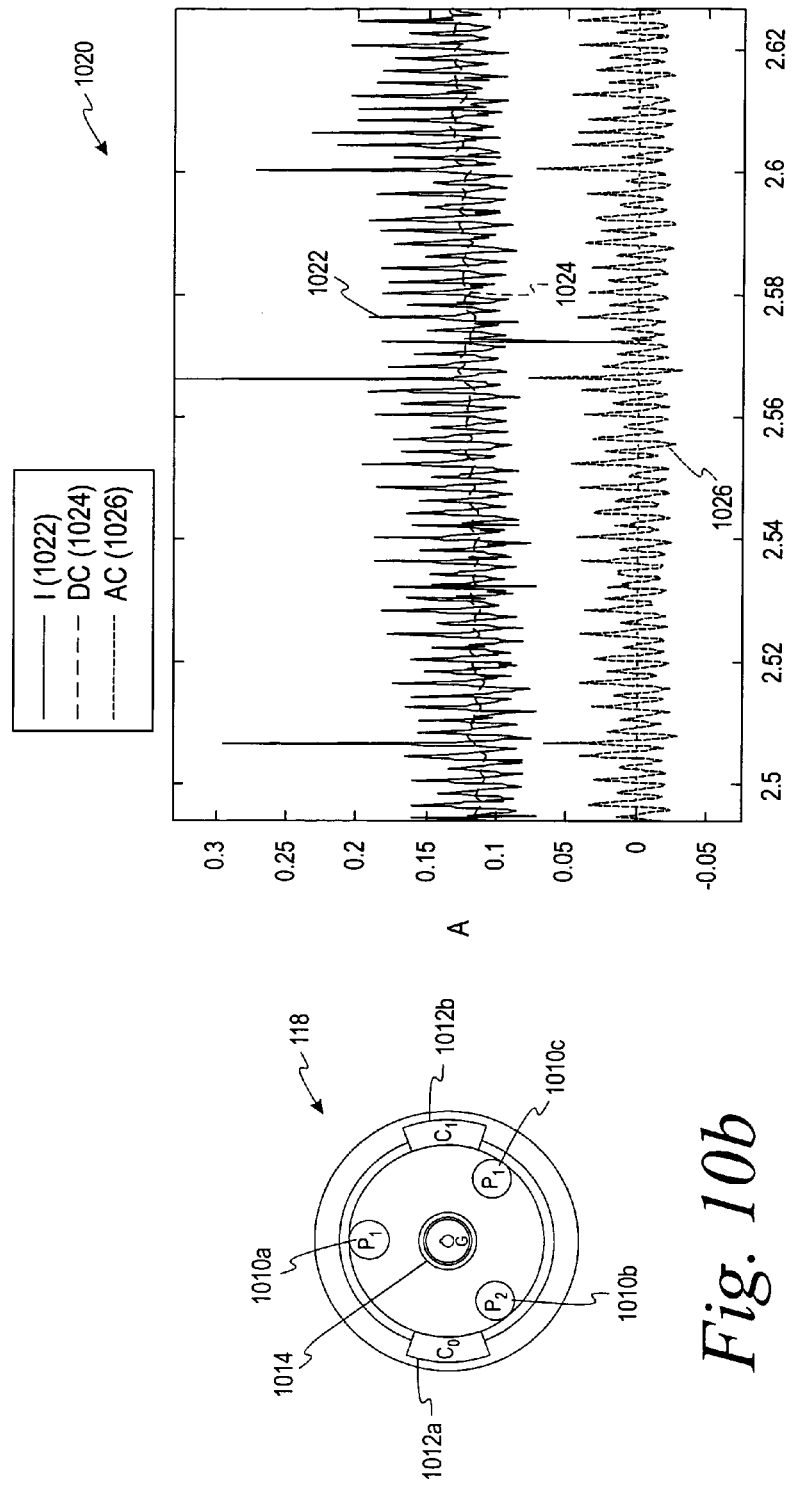
FIG. 10b is a functional cross-section of a DC motor suitable for use in connection with aspects of the present invention.
FIG. 10c is an illustration of an exemplary current signal to a DC motor, its DC component signal, and an AC component signal with the DC component signal removed.

FIG. 10c illustrates an exemplary chart 1020 of the current signal 1022 to the DC motor 118, its DC component signal 1024, and an AC component signal 1026 with the DC component signal 1024 removed. The AC component signal represents the error signal $e_k$ outputted by the CSF filter when adapted to remove the DC component signal 1024 of the current signal 1022.

The CSF adaptive filter 1122 matches the magnitude and phase of a stationary (or quasi-stationary relative to the convergence time of the filter) single-frequency primary signal 1126, and is exploited according to aspects of the present invention to match a time-varying single frequency 1134 with a complex exponential component 1140 of a primary signal 1126. The capability to match phase and magnitude with a single-frequency component of a primary signal 1126 of interest is of considerable utility. The capability inherent in the adaptation process to compensate for small residual frequency errors between the incident and primary signal paths is exploited here to support PLL analysis and synthesis applications.

In accordance with an embodiment of the present invention, the CSF PLL component 1120 synthesizes a signal 1130 that dynamically approximates the magnitude, phase and instantaneous frequency of a component of interest (such as the fundamental frequency of the motor 118) in a time-varying primary signal 1126 whose single frequency of interest shifts dynamically and aperiodically over time. An efficient discrete implementation may be derived from the CSF filter architecture used for bias removal by mixing the primary path down to a complex baseband with a synthetic complex exponential 1140 at the fundamental frequency 1134, and adding a second adaptive loop 1120 to track that fundamental frequency 1134.

The CSF PLL 1006 consumes a real or complex primary signal 1126, $d_n$, and an internal complex exponential incident signal, $x_n$ 1132. This complex exponential incident signal 1132 is synthesized at an instantaneous frequency of interest 1134, $f_n$.

CSF adaptive filter theory depends on the assumption that the incident signal 1110 is stationary, though the instantaneous frequency of a CSF PLL is dynamic. The CSF filter 1100 can tolerate a slow rate of change in the instantaneous incident frequency 1112 relative to the convergence time constant of the CSF adaptive filter 1100, but cannot adapt to rates of changes in the instantaneous incident frequency 1112 that exceed the convergence time constant of the CSF adaptive filter 1100. The CSF PLL 1006 provides a solution to this problem, by adding a PLL component 1120 to adapt the instantaneous incident frequency 1134 as a function of time. As a result, the CSF PLL 1006 matches not only the phase and magnitude of the primary signal 1126, but also the instantaneous frequency of a time-varying component of interest in the primary signal 1126.

The reference signal 1130, $y_n$, is generated as a scaled and phase-shifted product of the incident signal 1132 and the adaptive complex coefficient 1128, $w_n$. The reference signal 1130 may be real or complex, depending upon the primary signal 1126. If the primary signal 1126 is real, the complex product of the incident signal 1132 and the complex coefficient 1128 is simply projected onto the real plane to form an appropriate reference signal 1130 representation. A difference of the primary 1126 and reference 1130 paths produces a real or complex error signal 1124, $e_n$, used in iterative adaptation 1136 of the coefficient 1128.

The error signal 1124 $e_n$ is a CSF PLL 1006 output. The reference signal 1130 can also be of external interest, depending upon the configuration and selected behavior of the filter 1122. When employed in the CSF PLL 1006, instantaneous incident frequency 1134 is a directly accessible product.

Adaptation of the Complex Coefficient

Adaptation in the CSF PLL 1006 includes adaptation of the complex coefficient 1128 in the CSF adaptive filter 1100, and an adaptive process producing instantaneous incident frequency 1112. The function of the complex coefficient 1128 is to match magnitude and phase with a single-frequency component of the primary signal 1126 corresponding to the incident signal 1132. Instantaneous incident frequency 1112 defines the frequency of the incident signal 1132 at any time, and is responsible for matching frequency with a single-frequency component of interest in the primary signal 1126. Incident frequency adaptation 1138 is dependent upon the complex coefficient 1128, but may otherwise be considered independently, as illustrated in the discussion to follow.

Adaptation of the CSF adaptive filter coefficient 1128 allows the reference signal 1130 to correspond in magnitude and phase with a component of the primary signal 1126. If this primary complex exponential component is stationary, or quasi-stationary relative to the convergence time of the filter, convergence occurs.

Convergence may be defined as approaching, within statistical bounds, the optimal coefficient solution. If the primary component of interest is stationary, the reference may correspond most effectively at an optimal coefficient value. As the relative magnitude and phase of the primary component are not known a priori, and may be time-varying, a general approach is necessary to find the optimal coefficient solution in any environment.

The performance surface, $\zeta_\omega$, is introduced as a cost function, an N-dimensional representation of mean squared error as a function of the coefficient value. It is important to note that alternate definitions of error cost function, and corresponding performance surface, exist and are algorithmically dependent.

$$\zeta \underset{\lim \overline{N} \to \infty}{=} \frac{\sum_{n=0}^{N-1} e_n e_n^*}{N}$$

Conveniently, the CSF adaptive filter 1122 has a performance surface that exists in 3-dimensions, with precisely two degrees of freedom corresponding to real and imaginary components of the coefficient. In a stationary environment, the performance surface is hyperparabolic, with elliptical projections onto the coefficient plane of constant error. As the incident signal is stationary and symmetric, projections are symmetric, and circular.

Eigenvectors define principal axes of the performance surface, and eigenvalues, $\lambda$, correspond to the 2nd derivatives of the performance surface, along the principal axes. In this symmetric performance surface, two eigenvalues exist, and they are equal.

Various methods of adaptation employ a common basic principle, gradient descent. Through definition of a differentiable cost function, it is possible to derive an estimate of the gradient, $\nabla_n$, of the performance surface. The gradient estimate may be used to iteratively traverse the performance surface from any initial condition, to the region of the optimal coefficient solution, a minima, in a direct manner.

$$\omega_{n+1} = \omega_n - \tilde{\nabla}_n$$

Adaptive algorithms possess many differentiating attributes, including computational complexity, available resources and transient and persistent performance, which may be distilled to quantifiable metrics including convergence time constants and misadjustment.

Adaptive Coefficient Adaptation Implementations

In the CSF PLL 1006, there are two adaptations that occur: (1) adaptation of the complex coefficient 1128 in the coefficient adaptation component 1136; and (2) adaptation of the incident frequency 1134 in the frequency adaptation component 1138. First, various coefficient adaptation implementations will be discussed, followed by different implementations of frequency adaptation.

Least Means Squared Coefficient Adaptation

Least Means Squared (LMS) defines a noisy, but unbiased estimate of the (coefficient) gradient in the sense that the mean of the estimate of the coefficient gradient may be shown to equal the actual gradient. The coefficient gradient estimation has a Finite Impulse Response (FIR), and unity memory depth, as only immediate instantaneous error is used. LMS coefficient adaptation employs a posteriori estimation error.

The coefficient gradient is estimated as a function of the error signal 1124 and the conjugate of the incident signal 1132:

$$\tilde{\nabla}_n = \frac{\partial e_n^2}{\partial \omega} = -2e_n x_n^*;$$

and $$\omega_{n+1} = \omega_n + 2\mu e_n x_n^*.$$

A rate of adaptation, $\mu$, controls the transient convergence time, persistent estimation error, and overall stability of the LMS algorithm and the CSF adaptive filter 1122. The rate of adaptation may be constant, or dynamically normalized, with respect to the power of the signal incident 1132 upon the coefficient 1128:

$$\mu_n = \frac{\mu_0}{x_n x_n^*} = \frac{\mu_0}{A^2}$$

The symmetry of the CSF architecture, and a priori knowledge of the incident signal 1132 eliminates the need to explicitly normalize the rate of adaptation. In a complex CSF architecture, the LMS and NLMS implementations are algorithmically identical, with appropriate selection of the rate of adaptation.

Stability analysis of the response of a CSF LMS filter defines a stable range for the rate of adaptation, from over damped to critically damped:

$$0 < \mu \leq \left[\frac{1}{\lambda_{max}} < \frac{1}{tr[R]} = \frac{1}{2A^2}\right].$$

Adaptive coefficients in FIR architectures are typically initialized with small random values (on the order of $\pm 10^{-3}$), in lieu of a priori information that could be used to generate a more accurate initial estimate of the optimal coefficient solution.

Consider a set of 16 CSF LMS filters with initial coefficient values distributed uniformly about a known optimal solution for a specific stationary primary signal. Given the symmetry present in the performance surface, convergence time is independent of the initial coefficient, equidistant from the optimal solution. In this environment, convergence is exclusively a function of the unique assignment of rates of adaptation on a binary logarithmic scale in [5e-3, 0.5], assigned to filters with initial relative coefficient phase in [0, $2\pi$).

The primary signal is a complex exponential with 100 dB Signal to Noise Ratio (SNR) at a frequency of 0.3. Symmetry evident in the projections of the performance surface graphically confirms that the eigenvalues are indeed equal. Coefficient histories traverse the performance surface with direction controlled by local gradient estimates. Convergence time is optimal in the critically damped case, and progressively slower at over damped rates of adaptation.

Convergence may be expressed analytically as a time constant, $\tau$, as learning curves, or traces across the performance surface are characterized by multi-mode exponential decay. Modal time constants are dependent upon eigenvalues, with ensemble effect.

$$\zeta_n = \sum_{i=0}^{N-1} \zeta_{0,i} e^{-\frac{n}{\tau_i}} \approx \zeta_0 e^{-\frac{n}{\tau}}$$

$$\tau = \frac{1}{2tr[R]\mu} = \frac{1}{4A^2\mu}$$

Coefficient gradient approximation results in misadjustment, M, a normalized measure of persistent estimation error introduced by the adaptive algorithm. Misadjustment is proportional to the rate of adaptation:

$$M \underset{\lim n \to \infty}{=} \frac{\zeta_n - \zeta_{min}}{\zeta_{min}} \approx \frac{1}{2\tau} = 2A^2\mu.$$

The error frequency response of the CSF LMS filter, as a function of rate of adaptation, is particularly instructive. The power frequency response of the error signal with respect to the primary signal illustrates narrow band-reject performance.

Bandwidth, B, the distance in normalized frequency at −6 dB power points, is proportional to the rate of adaptation. Quality is a related metric.

$$B_i \approx \frac{2A^2\mu_i}{\pi}$$

$$Q_i = \frac{f}{B_i} \approx \frac{f\pi}{2A^2\mu_i}$$

Recursive Least Squared Coefficient Adaptation

According to another implementation, coefficient adaptation uses a recursive least squared (RLS) method. RLS defines an unbiased and accurate estimate of the gradient. RLS defines a convenient exponentially weighted cost function, and applies efficient recursive techniques to approximate a matrix inversion.

$$\zeta_n = \sum_{i=0}^{N-1} (1-\mu)^{n-i} e_i e_i^*$$

$$\Phi_n \omega_n = \theta_n$$

The simplicity and symmetry of the CSF adaptive filter architecture, and a priori knowledge of the incident signal, may be exploited to further reduce computational complexity of an RLS solution.

The RLS gradient estimation has an Infinite Impulse Response (IIR), and variable memory depth, as incident variance, $\sigma_n^2$, is recursively estimated. Gain factor, $k_n$, scales the a priori error estimate, $\alpha_n$, with the inverse of the incident variance.

$$k_n = \frac{x_n}{\sigma_{n-1}^2}$$
$$\sigma_n^2 = (1-\mu)\sigma_{n-1}^2 + A^2$$
$$\alpha_n = d_n - x_n\omega_n$$
$$\tilde{\nabla}_n = -\alpha_n k_n^*$$
$$\omega_{n+1} = \omega_n + \alpha_n k_n^*$$

Normalizing the coefficient gradient estimate with the inverse incident signal power scales the magnitude of the gradient vector to effectively support a critically damped solution. Adaptive normalization of the coefficient gradient prevents gradient noise amplification and instability inherent in under damped solutions, and slow convergence characteristic of over damped solutions. RLS, unlike NLMS, enjoys an infinite region of support, resulting in convergence times with orders of magnitude reduction in stationary or quasi-stationary environments.

Incident Frequency Adaptation Implementations

The preceding discussion addressed adaptation of the adaptive coefficient 1128 in the coefficient adaptation component 1136. As shown in FIG. 11b, the CSF PLL 1006 also includes an incident frequency adaptation component 1138 that automatically adapts a dynamic incident frequency 1134. The following discussion focuses on this type of adaptation.

At least three different least-mean-square-based algorithms for incident frequency adaptation 1138 are provided: phase difference (DIFF), vector product (PROD), and law of sines (SINE). In a preferred implementation of the present invention, the incident frequency adaptation component 1138 of the CSF PLL 1006 uses a normalized least mean square (NLMS) algorithm based on the law of sines. As discussed above, two architectures of the CSF PLL 1006 are provided (FIGS. 14b and 14c). The relevant algorithms for each of the architectures are provided below, followed by a discussion of each of the different DIFF, PROD, and SINE methods.

Note that the adaptive coefficient (w) in the dynamic solution (CSF PLL 1006) is a complex exponential, whereas in the static solution (CSF adaptive filter 1100) w is a scalar constant. In a static environment, the incident frequency $f_i$ is multiplied by a scalar constant, but in a dynamic environment, it is multiplied by a complex exponential. The product of the two complex exponentials reveals the residual frequency.

Adaptation of the incident frequency 1134 seeks to eliminate residual frequency between the incident 1134 and primary 1126 signal paths, resulting in static convergence of the adaptive coefficient 1128, neglecting misadjustment. In other words, the PLL CSF 1006 seeks to traverse the performance surface (N+1 dimensions, error squared, and all adaptive coefficient axes) in the opposite direction of the gradient (or N+1 positional derivative), until it ultimately arrives in the vicinity of the global minimum of the performance surface, where it locally bounces around due to misadjustment. The CSF PLL 1006 determines the minimum error achievable. Put another way, the CSF PLL 1006 seeks to find a solution where the phase derivative approaches zero $$(\frac{\partial \phi_n}{\partial n} \approx 0,$$

discussed in more detail below), meaning that the performance surface has been substantially stabilized and the primary frequency has been matched.

Consider a CSF adaptive filter 1100 with a NLMS coefficient adaptation at a rate of adaptation of 1.0e-1, and a (DC) frequency of 0 Hz. The primary signal 1104 is a complex linear chirp with a 60 dB SNR at a frequency in [−5.0e-3, 5.0e-3].

The resulting CSF NLMS solution is dynamic. As the residual frequency is small, and within the bandwidth of the filter, the adaptive coefficient 1128 modulates the incident signal 1134 to match the instantaneous frequency of the primary signal 1126. The chirp coefficient history is traced in FIG. 12. A trace 1200 of the adaptive coefficient 1106 with a dynamic incident signal is shown without adaptation of the incident frequency by the CSF PLL.

Figure 12:
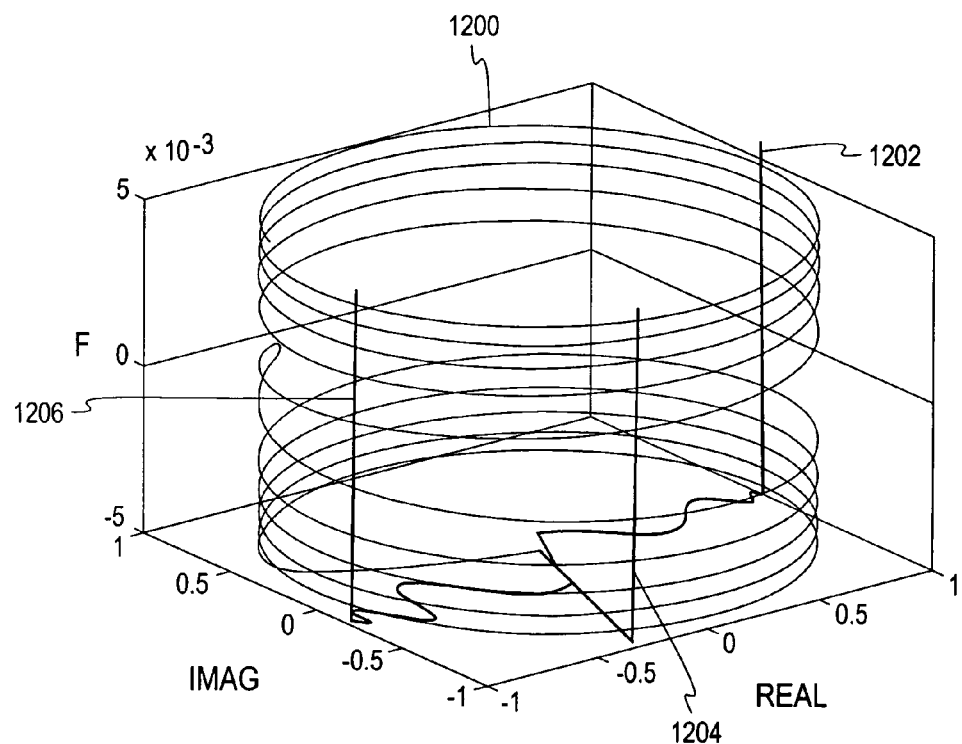
FIG. 12 is a chart depicting a chirp coefficient as applied by a complex single frequency normalized least mean squared phase-lock loop with incident frequency adaptation based on phase difference, vector product, and the law of sines approximation methods according to specific aspects of the present invention.
Figure 13:
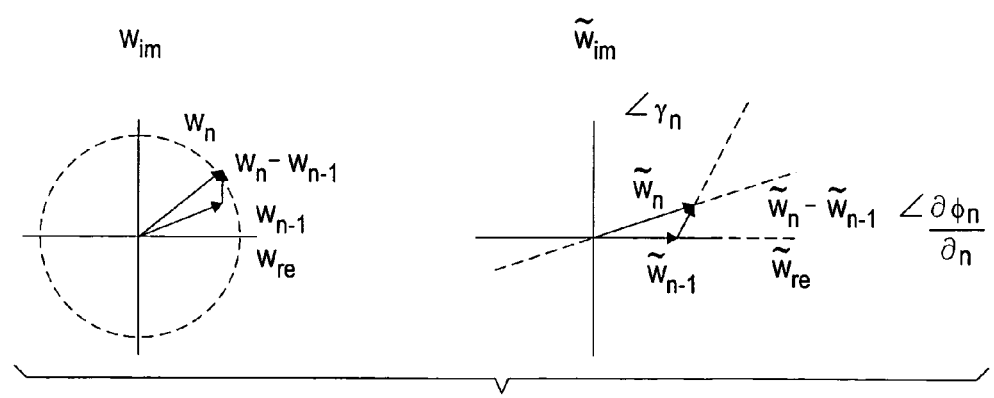
FIG. 13 are charts illustrating adaptive coefficient modulation as applied by a complex single frequency phase-lock loop according to an aspect of the present invention.

Additional traces 1202, 1204, 1206 superimposed over the trade 1200 depict complex coefficient adaptation with constant initial conditions in CSF PLL devices with identical coefficient adaptation, and incident frequency rate of adaptation of 5.0e-1. Incident frequency adaptation includes phase difference (DIFF) 1202, vector product (PROD) 1204 and law of sines (SINE) 1206 adaptation algorithms, from right to left, respectively, as shown in FIG. 12. Different initial phases were selected for ease of visualizing each of the traces 1202, 1204, 1206.

CSF PLL static solutions illustrate removal of residual frequency by adapting the incident frequency to match the dynamic frequency in a complex chirp. Consider proximate samples of the complex coefficient 1128 in the CSF PLL 1006, a corresponding difference vector, and a phase-rotated view for convenient analysis.

An arbitrarily depicted state has a positive rotation, suggesting the need for a corresponding increase in instantaneous incident frequency 1134 to compensate for the residual frequency present. The goal of incident frequency adaptation 1138 is not to predict a correlated signal by matching magnitude or phase, but rather to eliminate modulation of the adaptive coefficient 1128 of the incident signal 1132 by predicting the instantaneous frequency of a single-frequency primary signal 1126 component of interest.

An appropriate estimate of the performance surface gradient, $\nabla_n$, for employment in the incident frequency adaptive loop 1120 is derived from the observation that the rate at which the complex coefficient 1128 modulates the incident signal 1132 is equal to the residual frequency error. A discrete first-order temporal difference of the complex coefficient 1128 provides a fundamental metric for development and evolution of the incident frequency adaptation methods disclosed herein:

$$\tilde{\nabla}_n = -\frac{\partial \phi_n}{\partial n}, \text{ where } \frac{\partial \phi_n}{\partial n} \approx \phi_n - \phi_{n-1};$$

$\phi_n$ is the phase of the complex coefficient 1128, and n is the sample time. The CSF PLL 1006 iterates until the gradient $\nabla_n$ is minimized in a least mean squared sense or, more generally, statistically minimized $$\left(e.g., \frac{\partial \phi_n}{\partial n} \approx 0\right).$$

As explained above, the CSF PLL 1006 seeks to traverse the performance surface in the opposite direction of the gradient until it arrives in the vicinity of the global minimum of the performance surface, where it will locally bounce around due to misadjustment.

A. Least Mean Square Incident Frequency Adaptation

Least mean square (LMS) instantaneous incident frequency adaptation with a performance-surface gradient approximation based on the coefficient difference allows the CSF PLL 1006 to track a single-frequency primary signal 1126 component at an arbitrary and dynamic frequency.

$$f_{n+1} = f_n + \mu_f \frac{\partial \phi_n}{\partial n}$$

The incident frequency rate of adaptation required for optimal performance is often sufficiently large that LMS and NLMS coefficient adaptation results in superior CSF PLL performance.

Complex coefficient and incident frequency rates of adaptation are dependent. It is generally advisable to select an incident frequency rate of adaptation, $\mu_f$, that equals or exceeds the complex coefficient rate, ensuring that the complex coefficient 1128 changes slowly as observed by the incident frequency adaptation 1138.

1. Phase Difference (DIFF) Frequency Adaptation

The phase difference method of incident frequency adaptation directly computes the difference of coefficient phase to estimate $\partial \phi_n/\partial n$.

$$\tilde{\nabla}_{f,n} = -\frac{\partial \phi_n}{\partial n} \approx -\left(\tan^{-1}\left(\frac{\omega_{im,n}}{\omega_{re,n}}\right) - \tan^{-1}\left(\frac{\omega_{im,n-1}}{\omega_{re,n-1}}\right)\right)$$

The phase difference method requires two inverse tangent and divide operations, and can require an unbiased $\pm\pi$ phase-unwrap operation prior to is application to incident frequency update 1138.

2. Vector Product (PROD) Frequency Adaptation

The vector product method of incident frequency adaptation uses a ratio of cross and inner product relationships to produce a direct estimate of $\partial \phi_n/\partial n$.

$$\tan\left(\frac{\partial \phi_n}{\partial n}\right) \approx \frac{(\omega_{n-1} \times \omega_n) \cdot \hat{k}}{\omega_{n-1} \cdot \omega_n}$$

$$\tilde{\nabla}_{f,n} = -\frac{\partial \phi_n}{\partial n} \approx -\tan^{-1}\left(\frac{\omega_{re,n-1}\omega_{im,n} - \omega_{im,n-1}\omega_{re,n}}{\omega_{re,n-1}\omega_{re,n} + \omega_{im,n-1}\omega_{im,n}}\right)$$

The vector product method is accurate, and exhibits rapid convergence. Performance is similar to the phase difference method. The vector product method requires a quadrant-oriented inverse tangent and a divide operation, both of which can be eliminated by approximation. The inverse-tangent function can be efficiently estimated by polynomial approximation, assigning the numerator and denominator of the product term ratio to imaginary and real components of complex value $x_n$ 1132.

$$\bar{\beta} = \begin{bmatrix} +0.318250 \\ +0.003314 \\ -0.130908 \\ +0.068542 \\ -0.009159 \end{bmatrix}$$

$$v_n = \frac{\min(|x_{re,n}|, |x_{im,n}|)}{\max(|x_{re,n}|, |x_{im,n}|)}$$

$$\bar{V}_n = [v_n \quad v_n^2 \quad v_n^3 \quad v_n^4 \quad v_n^5]^T$$

A restricted phase first-quadrant solution provides a direct, complementary or reflected inverse-tangent approximation.

$$y_n = sgn(x_{re,n}x_{im,n})\bar{\beta}^T \bar{V}_n [|x_{re,n}| \geq |x_{im,n}|]$$

$$0.5 - sgn(x_{re,n}x_{im,n})\bar{\beta}^T \bar{V}_n [|x_{re,n}| < |x_{im,n}|]$$

Reconciling original vector phase orientation, a restricted phase inverse-tangent approximation may be modified to support arbitrary phase.

$$\frac{\partial \phi_n}{\partial n} \approx y_n [x_{im,n} \geq -x_{re,n}]$$

$$y_n + 1[(x_{im,n} < -x_{re,n})(x_{im,n} \geq 0)]$$

$$y_n - 1[(x_{im,n} < -x_{re,n})(x_{im,n} < 0)]$$

Especially post-convergence, $\partial \phi_n/\partial n$ is small, making further simplification possible by evaluating only solutions near the positive real axis.

$$\frac{\partial \phi_n}{\partial n} \approx \tan^{-1}(x_n) \approx sgn(x_{re,n}x_{im,n})\bar{\beta}^T \bar{V}_n$$

3. Law of Sines (SINE) Frequency Adaptation

The small angle method of incident frequency adaptation applies a law of sines relationship, and several simplifying assumptions, resulting in a computationally trivial solution. This solution is the least computationally expensive of the three methods. Initial conditions can be bounded by exploiting a priori knowledge, for example, about the single-frequency of interest.

$$\frac{\sin\left(\frac{\partial \phi_n}{\partial n}\right)}{|\omega_n - \omega_{n-1}|} = \frac{\sin(\gamma_n)}{|\omega_n|}$$

The magnitude of the complex coefficient 1128 is essentially constant after convergence, excepting misadjustment and complex exponential synthesis error. The steady-state magnitude of the complex coefficient 1128 is generally significantly greater than the magnitude of its corresponding difference vector.

$$|\omega_n| \approx |\omega_{n-1}|$$

$$|\omega_n| \gg |\omega_n - \omega_{n-1}|$$

The preceding observations may be applied to simplify the defined law of sines relationship. A complex coefficient 1128 with nearly constant magnitude and a relatively small difference vector, supports the simplifying assumptions that complementary angle $\gamma_n$ is approximately equal to $\pm\pi/2$ radians, and the difference vector has a dominant imaginary component. Further, the small angle sine approximation is applicable.

$$\sin(\gamma_n) \approx sgn(\omega_{re,n})$$

$$|\omega_n - \omega_{n-1}| \approx |\omega_{im,n} - \omega_{im,n-1}|$$

$$\sin\left(\frac{\partial \phi_n}{\partial n}\right) \approx \frac{\partial \phi_n}{\partial n}$$

Applying the defined simplifying assumptions to the law of sines relationship results in a computationally trivial estimate of $\partial\phi_n/\partial n$. Note that the result is scaled by the magnitude of the complex coefficient, as this nearly constant term may be accommodated by judicious selection of the rate of adaptation, avoiding a divide operation.

$$\tilde{\nabla}_{f,n} = -\frac{\partial \phi_n}{\partial n} \approx -sgn(\omega_{re,n})(\omega_{im,n} - \omega_{im,n-1})$$

Regardless of the instantaneous incident frequency adaptation method (DIFF, PROD, or SINE) employed, the CSF PLL component 1120 is readily accessible for phase estimation, after bias removal, with little or no further processing. Judicious selection of an anti-aliasing filter, or a discrete low-pass filter can suffice.

Mechanical travel of the transfer switch mechanism 102 is determined by estimating the phase using the CSF PLL 1006, and then integrating that phase over time, or simply counting the periods of the fundamental component. A zero crossing with positive trajectory and sufficient amplitude to be considered other than noise can suffice to classify one fundamental period. A limit on the period to define some maximum fundamental frequency can improve estimates at high speeds, and support improved noise immunity.

According to an implementation, the DSP 1004 is a TMS320F2812 from Texas Instruments. The integrated H-bridge motor controller 112 is an MC33887 from Freescale. The DC motor 118 was a Copal HG37-200-AB-00 model, rated at 24 volts, with a 200:1 gear ratio, an external rate of rotation in 22-25 rpm, and a rotor lock current of 0.7 amps.

The motor controller 112 directly provided a divided current source reflecting the H-bridge high-side supply current, which is low-pass filtered and amplified by a simple shunt RC circuit mapping current in [0, 0.7] amps, with a bandwidth of approximately 500 Hz. The DSP integrated 12-bit ADC sampling rate is fixed at 100 kHz, and the control loop bandwidth is fixed at 2 kHz, the fastest rate supported by the motor controller 112. The motor 118 is PWM-controlled, producing inband noise that is handled by the CSF PLL 1006. It is desirable to design the system 100 to avoid conflicts with known sources of noise and the signal of interest. For example, the PWM switching frequency can be selected that is not near the expected range of fundamental frequencies of the motor (e.g., 440-500 Hz), allowing the CSF PLL 1006 to reliably track the instantaneous frequency component of interest.

Figure 14A:
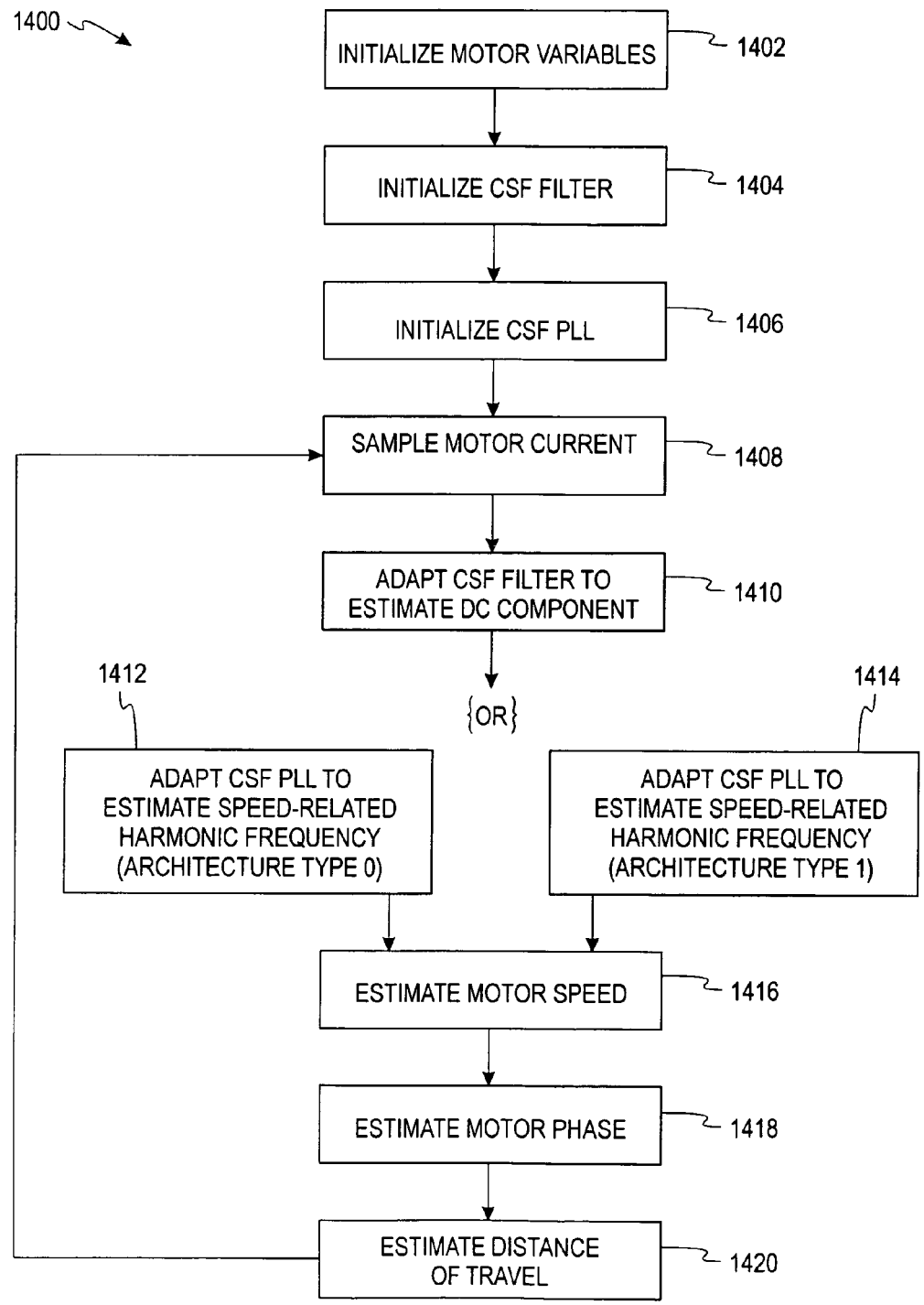
FIG. 14a is a flow chart diagram of a method of estimating a distance of travel of a load coupled to a DC motor in accordance with an aspect of the present invention.

FIG. 14a is a flow chart diagram 1400 of alternate architectures (type 0 and type 1) for automatically estimating a distance of travel of a load coupled to a DC motor 118 according to specific aspects of the present invention. First, the motor variables are initialized (1402) as follows:

The motor speed $r_m$ is initialized to its unloaded motor speed of the motor 118. In this example, the unloaded motor speed is 25 RPMs: $r_m = 25 \cdot 2 \cdot \pi \cdot 60$ rad/s. It should be noted that the values provided herein are exemplary only to illustrate a specific aspect of the present invention.

Using the expression, $$f_m = \frac{RGCP}{60},$$

the motor frequency is initialized based upon the motor speed and its geometry:

$$f_{m,0} = \frac{r_{m,0} \cdot G \cdot C \cdot P}{60} \text{ Hz}.$$

Hz. The motor phase is initialized to zero: $\phi_{m,0}=0$ rad. A variable that accumulates the mechanical distance traveled is initialized to zero: $\Delta_{m,0}=0$ mm. A mechanical conversion constant (for a specific system geometry) is initialized to the ratio of the distance traveled to the phase of travel: $\gamma_m=0.0245$ mm/rad. It should be understood that this mechanical conversion constant can be different other system geometries.

Once the motor variables are initialized, the CSF filter 1100 is initialized (1404) as follows. The incident frequency 1112 is initialized to zero: $fi_{DC}=0$ (DC). The adaptive coefficient 1106 is initialized to a small, random real value: $w_{DC,0}=\pm 10^{-3}$.

The CSF PLL 1006 is initialized (1406) as follows. The incident frequency 1134 of the CSF PLL 1006 is initialized based on the motor frequency and the sampling frequency (Nyquist rate):

$$fi_{PLL,0} = \frac{f_{m,0}}{0.5 \cdot f_s}.$$

For example, the sampling frequency can be 2 kHz in a specific embodiment (its corresponding Nyquist frequency would therefore be 1 kHz). This represents the speed-related harmonic of interest. The adaptive coefficient 1128 is initialized to a small, random complex value: $w_{PLL,0}=\pm 10^{-3} \pm j \cdot 10^3$. The motor current is sampled to the primary signal 1126 of the CSF PLL 1006 (1408) followed by adaptation in the CSF filter 1100 and CSF PLL 1006 as described next: $d_{DC,n}=i_{m,n}$.

DC estimation is carried out by adapting the CSF filter 1100 (1410) as follows. The adaptive coefficient 1106 is assigned to the reference signal 1108: $y_{DC,n}=w_{DC,n}$. The error signal 1102 is assigned to the difference between the primary signal 1104 and the reference signal 1108: $e_{DC,n}=d_{DC,n}-y_{DC,n}$. The coefficient gradient is estimated as a function of the error signal 1102: $\nabla_{wDC,n}=f(e_{DC,n})$. An estimate of the adaptive coefficient 1106 is estimated as a function of the coefficient gradient at a rate of adaptation:

$$w_{DC,n+1} = W_{DC,n} - \mu \cdot \nabla_{wDC,n}.$$

Adaptation of the CSF PLL can occur according to one of the two architectures (type 0 or type 1) mentioned above and illustrated in FIGS. 14b and 14c, respectively. Using architecture type 0 (FIG. 14b), the CSF PLL is adapted to estimate the speed-related harmonic frequency (1412). The expressions for adaptation of the CSF PLL architecture type 0 are provided below and are illustrated in FIG. 14b. Those expressions are reproduced here in summary form:

$$x_{PLL,n} = e^{j\pi f_{iPLL,n}};$$

$$y_{PLL,n} = x_{PLL,n} \cdot w_{PLL,n};$$

$$d_{PLL,n} = e_{DC,n};$$

$$e_{PLL,n} = d_{PLL,n} - y_{PLL,n};$$

$$\nabla_{wPLL,n} = f(e_{PLL,n}, x_{PLL,n});$$

$$w_{PLL,n+1} = w_{PLL,n} - \mu \cdot \nabla_{wPLL,n};$$

$$\nabla_{fiPLL,n} = f(w_{PLL,n});$$

$$fi_{PLL,n+1} = fi_{PLL,n} - \mu \cdot \nabla_{fiPLL,n}.$$

Alternately, using architecture type 1 (FIG. 14c), the CSF PLL is adapted to estimate the speed-related harmonic frequency (1414). The expressions for adaptation of the CSF PLL architecture type 1 are provided below and are illustrated in FIG. 14c. Those expressions are reproduced here in summary form:

$$x_{PLL,n} = e^{j\pi f_{iPLL,n}};$$

$$y_{PLL,n} = w_{PLL,n};$$

$$d_{PLL,n} = e_{DC,n} \cdot x_{PLL,n}^*;$$

$$e_{PLL,n} = d_{PLL,n} - y_{PLL,n};$$

$$\nabla_{wPLL,n} = f(e_{PLL,n}, x_{PLL,n});$$

$$w_{PLL,n+1} = w_{PLL,n} - \mu \cdot \nabla_{wPLL,n};$$

$$\nabla_{fiPLL,n} = f(w_{PLL,n});$$

$$fi_{PLL,n+1} = fi_{PLL,n} - \mu \cdot \nabla_{fiPLL,n}.$$

Once the incident frequency 1134 has been adapted by the CSF PLL 1006 according to the architecture type 0 or type 1, the motor speed is estimated (1416) as a function of the incident frequency 1134 of the CSF PLL 1006 and the motor geometry parameters (G, C, P):

$$r_{m,n} = fi_{PLL,n} \cdot \frac{2 \cdot \pi}{G \cdot C \cdot P} \text{ rad/s}.$$

Next, the motor phase is estimated (1418) by integrating the motor phase as a function of the motor speed and the sampling frequency:

$$\varphi_{m,n+1} = \varphi_{m,n} + \frac{r_{m,n}}{f_s} \text{ rad}.$$

The distance of travel is estimated by integrating the mechanical distance as a function of the motor phase and the mechanical conversion constant: $\Delta_{m,n+1} = \Delta_{m,n} + \phi_{m,n+1} \cdot \gamma_m$ mm. The algorithm 1400 loops back to sample the motor current (1408) and the adaptation and estimation process is repeated.

Architecture Type 0

Figure 14B:
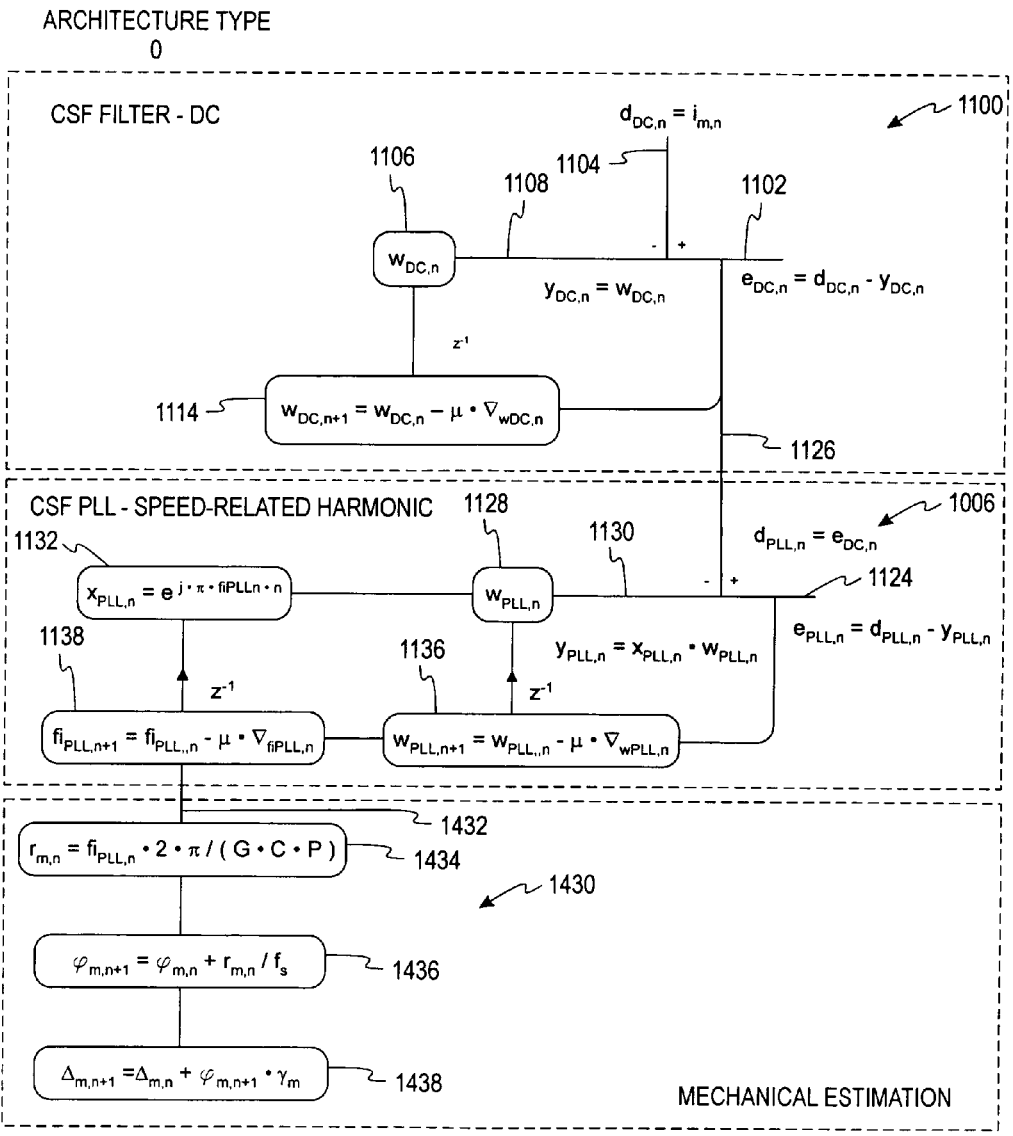
FIG. 14b is a flow chart diagram of a first architecture for estimating a speed-related harmonic of a DC motor according to an aspect of the present invention.
Figure 14C:
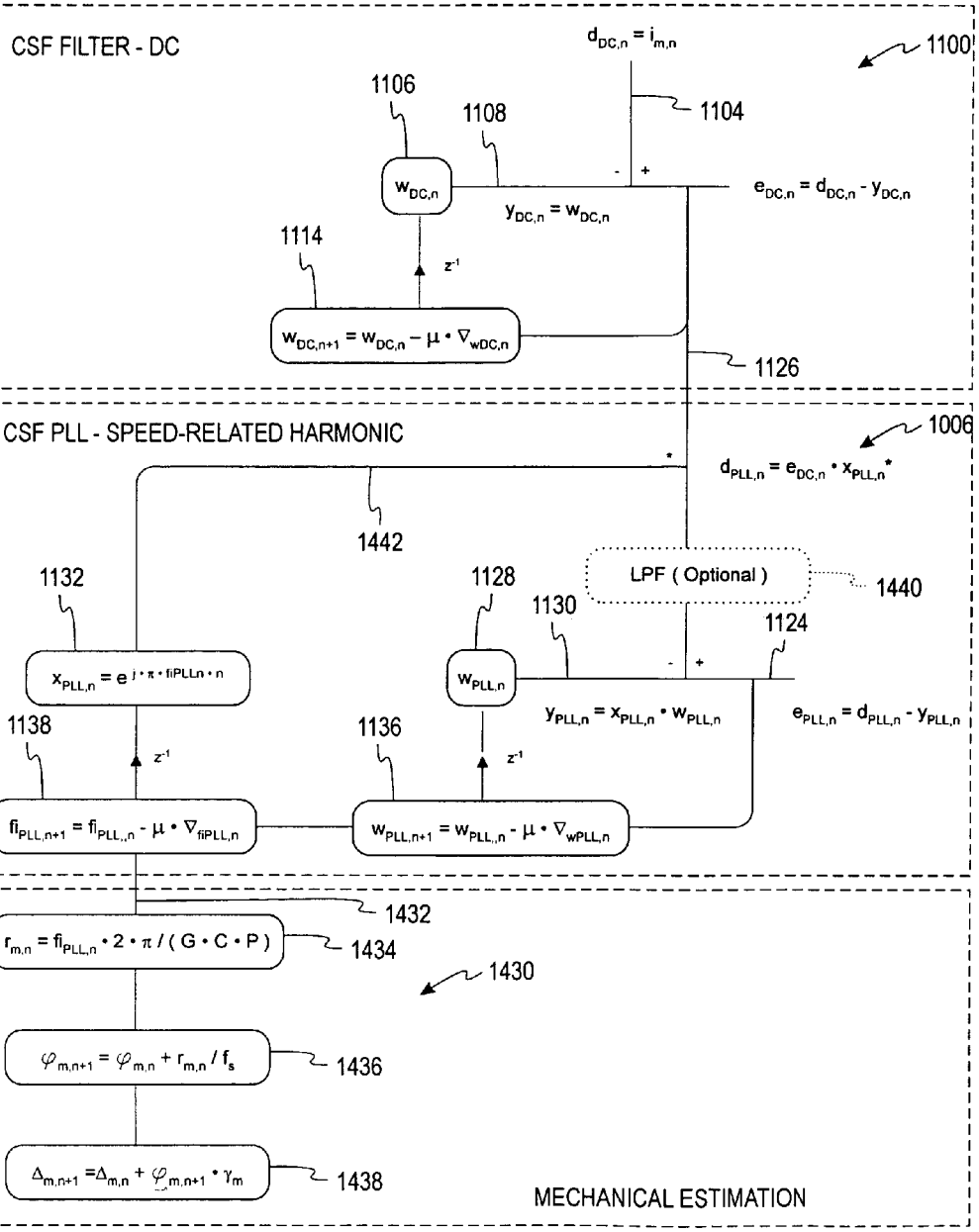
FIG. 14c is a flow chart diagram of a second architecture for estimating a speed-related harmonic of a DC motor according to another aspect of the present invention.

FIG. 14a refers to two architectures for frequency adaptation: architecture type 0 (1412) shown in FIG. 14b and architecture type 1 (1414) shown in FIG. 14c. These architectures will be discussed next.

A sample of the incident signal 1132 (at sample time n) of the CSF PLL 1006 is synthesized into a complex exponential as follows: $x_{PLL,n} = e^{j\pi f_{iPLL,n}}$;

The reference signal 1130 of the CSF PLL 1006 is the product of the incident signal 1132 and the adaptive coefficient 1128: $y_{PLL,n} = x_{PLL,n} \cdot w_{PLL,n}$;

The error signal 1102 from the CSF filter 1100 (where the incident frequency 1112 is zero) is assigned to the primary signal 1126 of the CSF PLL 1006:

$$d_{PLL,n} = e_{DC,n};$$

The error signal 1124 of the CSF PLL 1006 is given by the difference of the primary signal 1126 and the reference signal 1130: $e_{PLL,n} = d_{PLL,n} - y_{PLL,n}$;

The performance surface gradient for adaptation of the adaptive coefficient 1128 (coefficient gradient) is estimated as a function of the error signal 1124 and the incident signal $\nabla_{wPLL,n} = f(e_{PLL,n}, x_{PLL,n})$;

The estimate of the adaptive coefficient 1128 is adapted as a function of the coefficient gradient: $w_{PLL,n+1} = w_{PLL,n} - \mu \cdot \nabla_{wPLL,n}$, where $\mu$ is the rate of adaptation;

The performance surface gradient for adaptation of the incident frequency 1134 (frequency gradient) is estimated as a function of the adaptive coefficient 1128: $\nabla_{fiPLL,n} = f(w_{PLL,n})$;

An estimate of the incident frequency 1134 is adapted as a function of the frequency gradient: $fi_{PLL,n+1} = fi_{PLL,n} - \mu \cdot \nabla_{fiPLL,n}$;

Architecture Type 1

Architecture type 1 is shown in FIG. 14c. Note that this architecture differs slightly as shown from the architecture shown in FIG. 11b (which generally illustrates the type 0 architecture), but the same reference numbers from FIG. 11b are used for clarity purposes with reference to architecture type 1 shown in FIG. 14c.

A sample of the incident signal 1132 (at sample time n) of the CSF PLL 1006 is synthesized into a complex exponential as follows: $x_{PLL,n} = e^{j\pi f_{iPLL,n}}$;

The reference signal 1130 of the CSF PLL 1006 is assigned to the adaptive coefficient 1128: $y_{PLL,n} = w_{PLL,n}$;

The primary signal 1126 of the CSF PLL 1006 is assigned to the product of the error signal 1102 from the CSF filter 1100 (where the incident frequency 1112 is zero) and the conjugate CSF incident signal 1442 (see FIG. 14c): $d_{PLL,n} = e_{DC,n} \cdot x_{PLL,n}^*$. By multiplying these two complex expressions, the primary signal is mixed down to complex baseband, which should be near DC if convergence has occurred. The error in frequency estimation will cause the adaptive coefficient to rotate at a revolution frequency that is commensurate with the error. A distinction between the type 0 and type 1 architectures is that the type 1 architecture permits the insertion of a low-pass filter after mixing the primary signal down to complex baseband to eliminate out-of-band interference that might confuse the CSF PLL 1006. In type 0, to remove out-of-band interference, the adaptive filter must be moved with the primary signal along the frequency of interest. A band-pass filter can be employed and recomputed dynamically, which can be computationally burdensome. By contrast, in type 1, the primary signal is moved down to DC and then passed through a single DC filter to eliminate out-of-band interference before adaptation in the CSF PLL occurs. The type 1 architecture also requires that the signals be expressed or converted to their complex as opposed to real representation.

The error signal 1124 of the CSF PLL 1006 is given by the difference of the primary signal 1126 and the reference signal 1130: $e_{PLL,n} = d_{PLL,n} - y_{PLL,n}$;

The performance surface gradient for adaptation of the adaptive coefficient 1128 (coefficient gradient) is estimated as a function of the error signal 1124 and the incident signal 1132: $\nabla_{wPLL,n} = f(e_{PLL,n}, x_{PLL,n})$. According to an aspect, the performance surface gradient is estimated as follows:

$$\tilde{\nabla}_{PLL,n} = \frac{\partial}{\partial w_{PLL}} e_n^* e_n = -2e_n.$$

The estimate of the adaptive coefficient 1128 is adapted as a function of the coefficient gradient: $w_{PLL,n+1} = w_{PLL,n} - \mu \cdot \nabla_{wPLL,n}$, where $\mu$ is the rate of adaptation. According to an aspect, the adaptive coefficient 1128 can be adapted approximately as follows: $w_{PLL,n+1} = w_{PLL,n} - \mu_{PLL} \tilde{\nabla}_{PLL,n} = w_{PLL,n} + 2\mu_{PLL} e_n$.

The performance surface gradient for adaptation of the incident frequency 1134 (frequency gradient) is estimated as a function of the adaptive coefficient 1128: $\nabla_{fiPLL,n} = f(w_{PLL,n})$;

An estimate of the incident frequency 1134 is adapted as a function of the frequency gradient: $fi_{PLL,n+1} = fi_{PLL,n} - \mu \cdot \nabla_{fiPLL,n}$ or $f_{i,n+1} = f_{i,n} - \mu_{f_i} \tilde{\nabla}_{f_i,n}$. Embodiments described herein can utilize either of these aforementioned two architectures.

Real frequencies are normalized as a fraction of the Nyquist rate, in [0, 1]. Rates of adaptation are fixed, and nominally less than unity.

Figure 15:
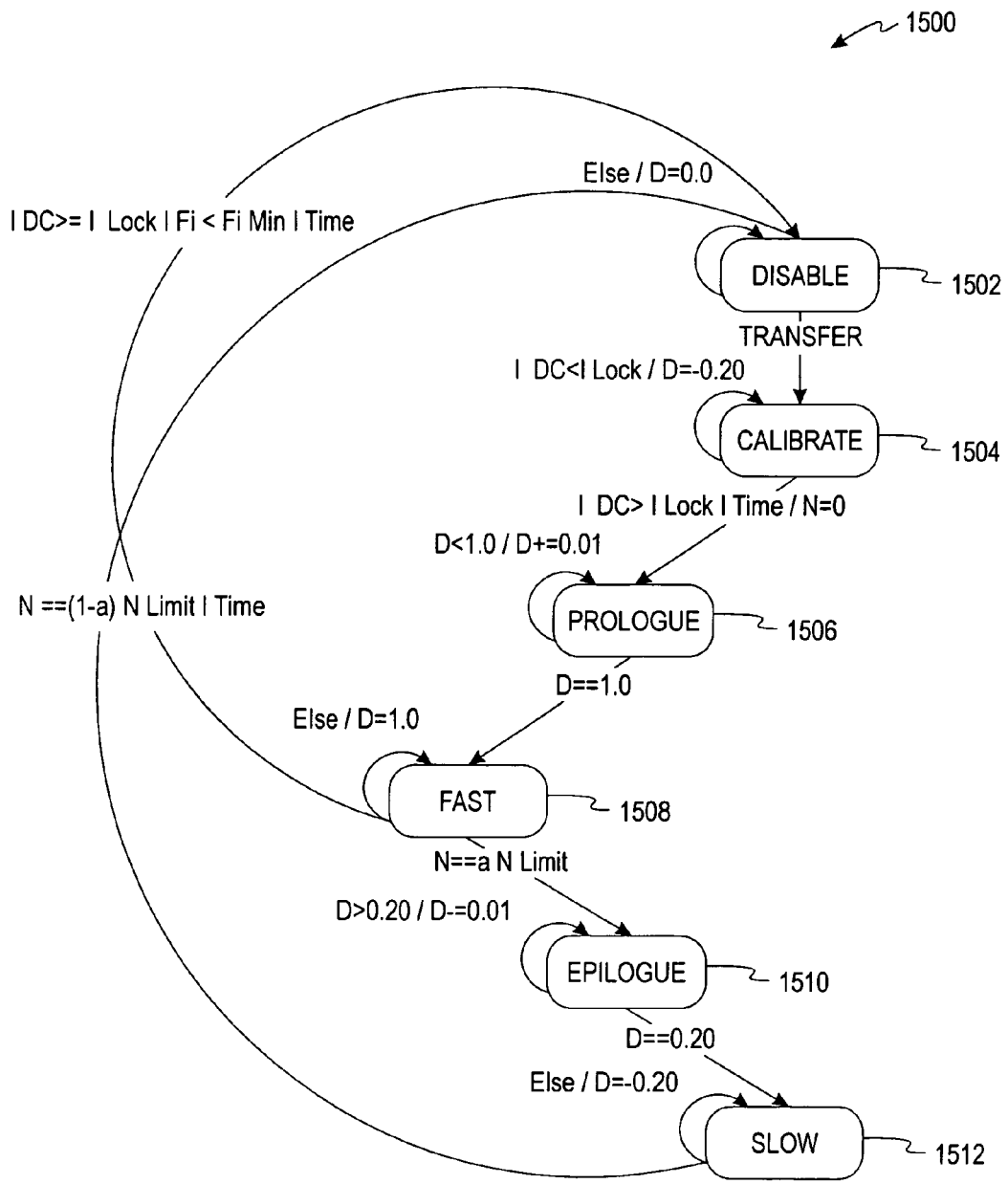
FIG. 15 is a transfer control state machine diagram of an implementation for determining when the transfer switch mechanism needs to be activated, and its required direction of movement according to a specific aspect of the present invention.

FIG. 15 is a transfer control state machine diagram 1500 of an alternate implementation for determining when the transfer switch mechanism 102 needs to be activated, and its required direction of movement. The distance traveled by the transfer switch mechanism 102 is estimated, in an aspect, by the CSF PLL 1006 described herein.

Estimates of the DC and AC components of the current of the motor 118, and the supply state variables 1502-1512 are used in the transfer control algorithm 1500. The current components are digitally separated in the DSP 1004, and the supply state variables 1502-1512 were available as isolated logic inputs from sensors or probes 130, 132 coupled to the power sources 104, 106 as described above.

An implicit transfer request creates a transition from a DISABLE state 1502 of the transfer control state machine 1500. The purpose of the control is to move the transfer switch mechanism 102 without hitting a terminus point at a speed that would damage the system 100. As movement of the transfer switch mechanism to 102 through a breaker in the distribution panel 120 requires nearly maximum DC motor power, the speed of the motor 118 should be varied during the transfer to accomplish the task as mentioned above.

DC motor speeds corresponding to duty cycles of approximately 0.20 or less does not cause discernable damage to the system 100, while hitting a hard stop is at full speed was found to damage the gear of the motor 118 after an unacceptable number of operations (a few hundred).

The DISABLE state 1502 is terminated when an implicit transfer request is detected through monitoring of supply voltages 104, 106. The DC motor 118 is stopped when disabled. The CALIBRATE state 1504 rewinds the transfer switch mechanism 102 to the hard stop in the opposite direction of intended transfer as described above in connection with FIG. 6. This serves to calibrate the initial position of the transfer switch mechanism 102. The DC motor 118 runs at a slow speed until a low voltage rotor lock condition is detected. The rate of change in the DC current or the rate of change in the fundamental period immediately prior to the detected rotor lock condition can provide a clue as to the nature of the cause of the stop. The two possibilities in the system 100 are contact with a main breaker, perhaps due to loss of power in the middle of a previous transfer, or the end of mechanical travel of the transfer switch mechanism 102. The former is a pathological case, and its detection may not be necessary in some systems.

The PROLOGUE state 1506 increases the duty cycle to soft-start the DC motor 118 in the intended direction of transfer, until the duty cycle is unity. The fundamental period integrator is reset on entry of the PROLOGUE state 1506. The FAST state 1508 keeps the DC motor 118 at full supply albeit load-dependent speed, until the number of periods of travel is sufficient to ensure that both breakers in the distribution panel 120 have been moved, or a pathological rotor lock condition is found. The EPILOG state 1510 soft-steps the DC motor 118 down to a slow forward supply. The SLOW state 1512 maintains the slow forward supply, and relatively constant speed, as the load on the motor 118 is nearly constant during this state. Terminus and transition to disable states occur when the fundamental period integrator exceeds some predefined physical limit corresponding to known mechanical travel of the system 100, or when a pathological rotor lock condition is found.

In some aspects, timers can be employed in several states to provide more robust control. Alternatively, in lieu of integrating fundamental periods, fixed timer applications may be sufficient during CALIBRATE, EPILOGUE and SLOW states 1504, 1510, 1512, especially when the PWM 302 provides the means of speed control to the motor 118.

Figure 16:
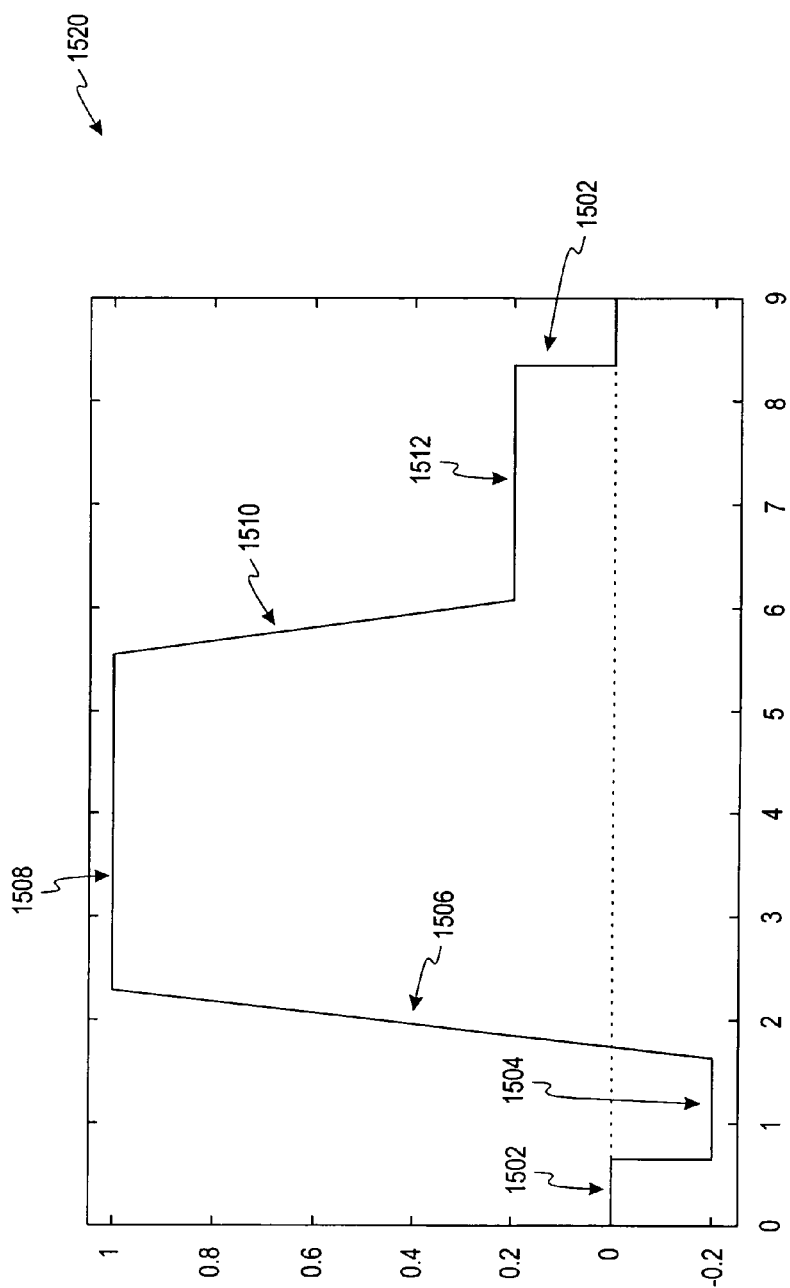
FIG. 16 illustrates a transfer control duty cycle across a range of travel for a transfer switch mechanism according to an aspect of the present invention.

A transfer control duty cycle chart is depicted in FIG. 16 across a range of travel for the transfer switch mechanism 102 according to an aspect of the present invention. The motor 118 starts in the DISABLE state 1502, then transfers to the CALIBRATE state 1504 where its direction is reversed, before moving to the PROLOGUE state 1506. The motor 118 is then put into the FAST state 1508 before being decelerated into the EPILOGUE state 1510. The motor 118 remains in the SLOW state 1512 for a period and then returns to the DISABLE state 1502 just prior to the terminus point, allowing the transfer switch mechanism 102 to coast to a full stop.

An alternative to PWM control calls for manipulation of the DC motor supply voltage to accommodate at least two states, corresponding to slow and fast duty cycle average motor speeds. The voltage-control method avoids the effects of pronounced inrush currents. In a PWM-controlled motor at the maximum 2 kHz rate with a 0.20 duty cycle, a significant motor current inrush results. Inrush is pronounced and can obscure the fundamental rotational component of the current signal at low speeds, reducing the accuracy of the phase-estimation CSF PLL 1006 previously described.

A two-speed voltage controlled system with no intra-transfer repetitive inrush developed with simple timer control, and a subsequent alternative phase estimation control algorithm is discussed above in connection with the back-EMF voltage algorithms.

III. Phase Detection by Commutator Pulse Detection

A third approach for automatically estimating motor phase is a DC motor phase detection algorithm that monitors the change in motor current to detect the pulses in the current caused by the commutator brushes crossing over the gap between rotor commutator segments as the shaft rotates. A pulse is generated each time a commutator brush breaks and then reconnects to a commutator segment. This implementation detects and counts the pulses in order to determine the number of revolutions the shaft has rotated. The motor phase can then be used to determine the distance, rotational or linear, that the moving portion of the load coupled to the motor has traveled. If the initial position of the moving portion of the device is known then the absolute position can be calculated.

Figure 17A:
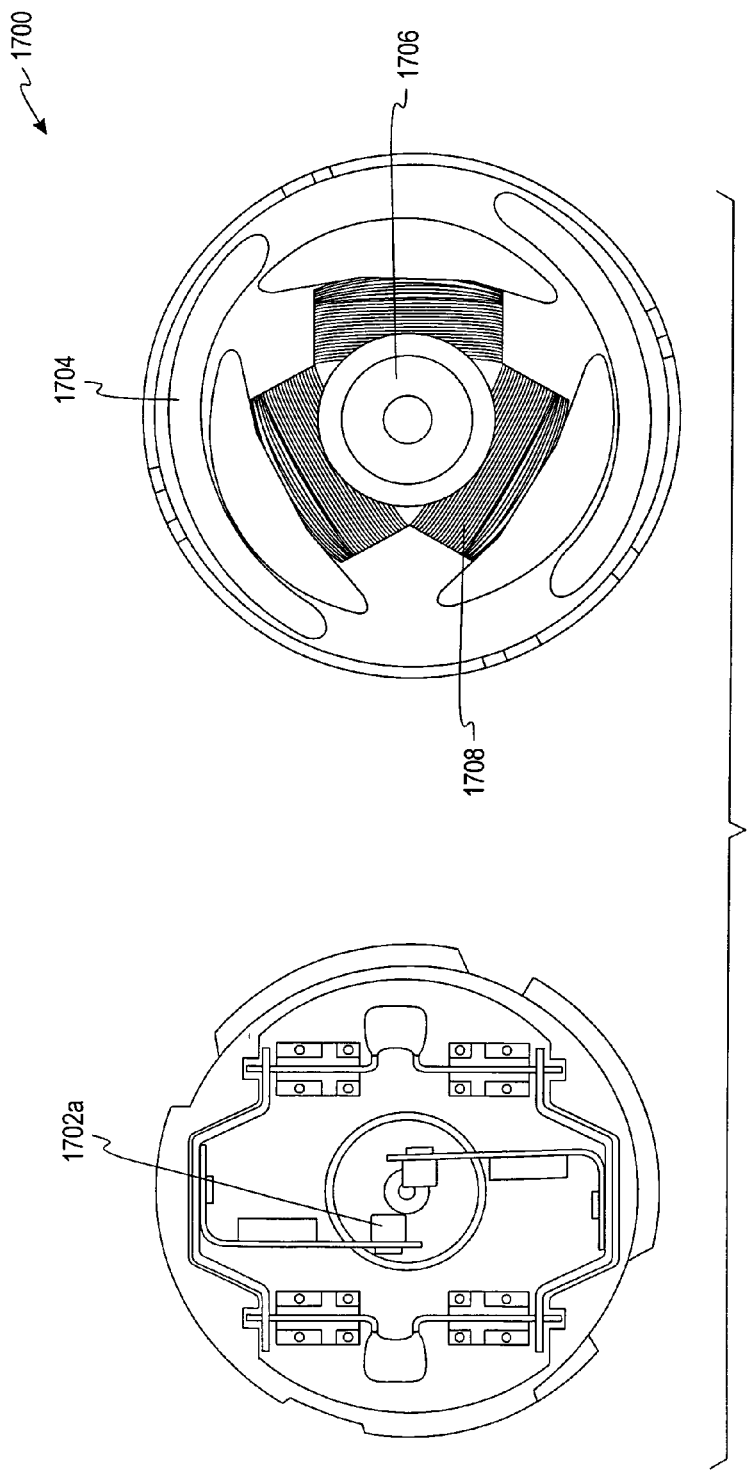
FIG. 17a are top illustrations of a back cover and a housing of a prior-art DC motor with some of its internal components revealed.

FIG. 17a illustrates the construction of a prior-art permanent magnet DC motor 1700, in one implementation, a HG37 from Copal USA Corp. in Torrance, Calif. Another suitable DC motor 1700 is part no. RB350200-30U91 available from Douglas International (also manufactured by Shayang Ye Industrial), which has brass gears and an embedded brush arc-suppression scheme built in to the rotor. The back cover has been removed from the motor 1700 housing to show the internal construction. The DC motor 1700 shown has two stator permanent magnets 1704, three armature electromagnetic poles 1708, one commutator 1706, and two commutator brushes 1702 (in a relaxed state because the back cover has been removed).

Figure 17B:
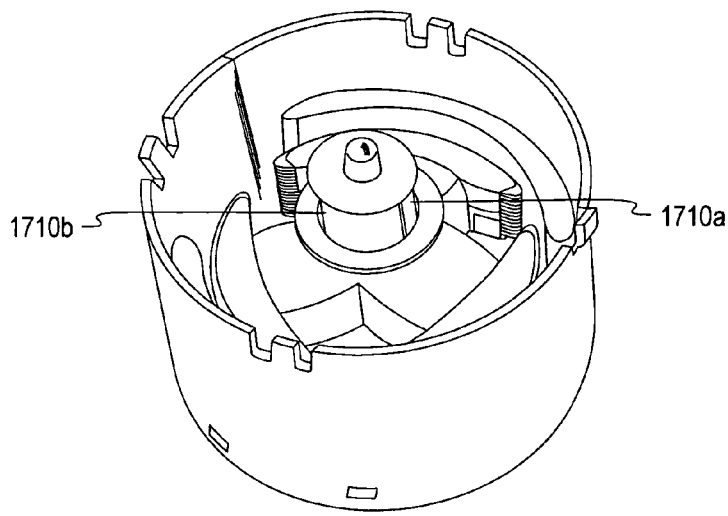
FIG. 17b is a perspective view of a housing of a prior-art DC motor.

FIG. 17b illustrates a perspective side view of the commutator 1706. The commutator 1706 has three segments 1710, although only two 1710a,b are visible, one for each armature electromagnetic pole 1708.

Figure 17C:
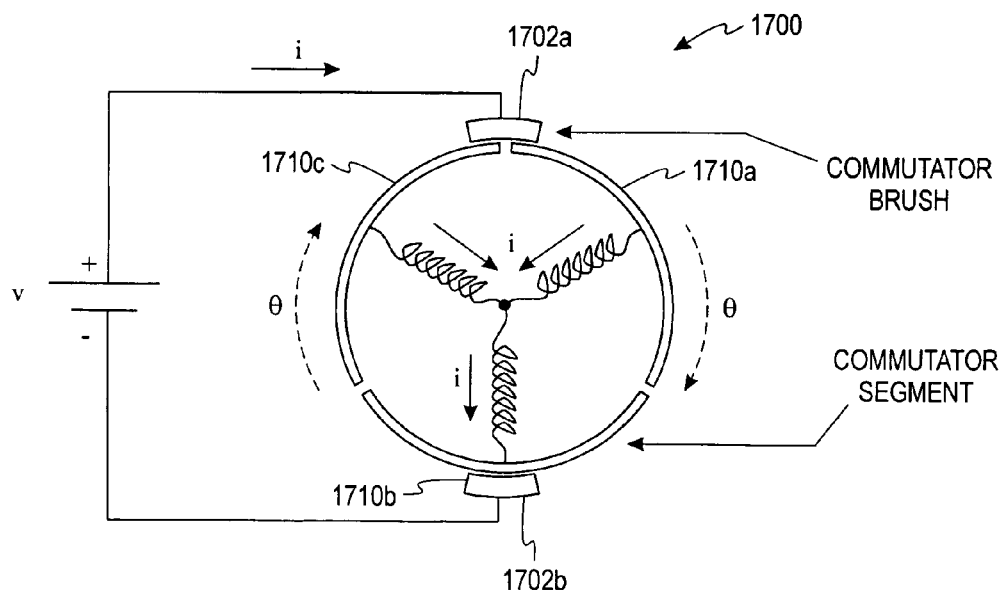
FIG. 17c is a functional block diagram of a prior-art DC motor suitable for use according to aspects of the present invention.
Figure 18:
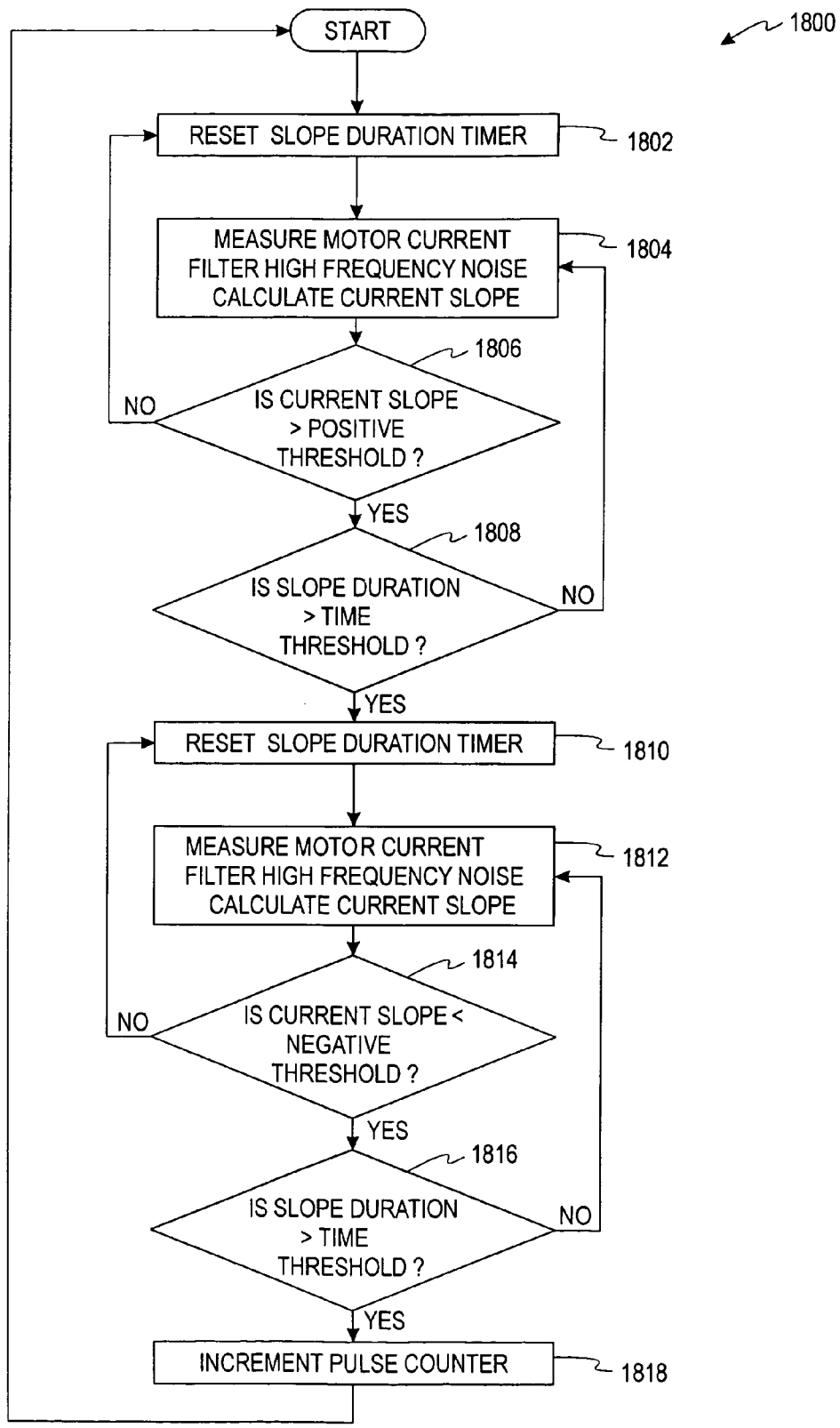
FIG. 18 is a flow chart of a method of estimating the phase of a DC motor according to an aspect of the present invention.

FIG. 17c is a functional circuit diagram of the permanent magnet DC motor 1700. A DC voltage, V, applied to the motor terminals causes current, I, to flow through the windings of the armature creating a magnetic field in quadrature (90°) of the magnetic field of the stator permanent magnets 1704. The force of the opposing magnetic fields trying to align themselves in the same direction causes the armature to rotate the motor phase θ. The rotation of the commutator 1706, which is physically attached to the armature, changes which segments 1710 are making contact with the brushes 1702, which in turn changes the direction of the current in the armature coils 1708. The reversal of direction of the current in the coil 1708, combined with the reversal of the physical orientation of the coil 1708, maintains the magnetic fields in proper alignment to produce a net positive torque and rotation.

The average current flowing through the motor 1700 is proportional to the average torque produced by the motor 1700. The current also has a second ripple component which is due to the commutator brushes 1702 making and breaking contact with the individual commutator segments 1710. Lastly, the current has a noise component which is due to intermittent contact between the commutator brushes 1702 and the commutator segments 1710 which can be caused by vibration or by dust from brush wear. An additional motor current noise component can also be introduced by electrical devices, such as capacitors or varistors, added to the motor circuit to reduce commutator arcing in order suppress electrical noise and increase commutator brush life.

The commutator ripple component in the motor current is a periodic quasi-sinusoidal signal that is caused by the brushes 1702 switching commutator segments 1710 as the rotor spins. A ripple pulse in the motor current occurs each time each brush switches to each commutator segment 1710. The number of commutator current pulses is directly related to the distance the motor shaft has rotated. The motor 1700 shown in FIG. 17c has two brushes 1702a,b and three segments 1710a,b,c; therefore there will be 6 pulses for every revolution of the motor shaft. The relative phase of the motor shaft can be detected to ⅙ of a revolution or to a 60 degree resolution.

The DC motor phase detection algorithm 1800 resets a slope duration timer (1802), then measures the instantaneous DC current, I, through the motor 1700 at the motor input terminals and filters the current to remove high frequency noise due to the intermittent contact between the commutator brushes 1702 and the commutator segments 1710 and the noise due to arc suppression devices (1804).

The DC motor phase detection algorithm 1800 continuously calculates the change in instantaneous motor current over constant intervals of time. The constant time interval must be significantly shorter than the expected period of the commutation pulses. The algorithm determines the calculated slope of the motor current over each time interval to detect the leading edge (rise time) and the trailing edge (fall time) of a commutation pulse. In a specific, non-limiting aspect, the rise-time threshold is 0.7 ms, and the fall-time threshold is 0.8 ms. The slope threshold is 8 mA over the rise or fall time thresholds. These threshold values are exemplary only, and those skilled in the art will appreciate that determination of the threshold values is dependent upon various factors including at least the load current and the motor current.

The DC motor phase detection algorithm 1800 looks for a positive slope in the motor current to indicate the beginning of a commutation pulse (1806). The positive slope must reach a threshold level that is much greater than the possible noise level and less than the minimum slope expected for the leading edge of a commutation current pulse (1806). The duration of the positive slope must also be greater than the duration of possible noise and less than the minimum duration for the leading edge of a commutation current pulse (1808).

The DC motor phase detection algorithm 1800 looks for a negative slope in the motor current to indicate the ending of a commutation pulse. The slope duration timer is reset (1810). The instantaneous motor current is measured, filtered to remove high-frequency noise, and the slope of the current is calculated (1812). When a negative slope is detected, it must also have a threshold level (1814) and duration (1816) that is much greater than that of possible noise but less than the minimum expected for a falling edge of a commutation pulse. A valid leading edge followed by a valid falling edge constitutes a complete commutation current pulse, whereupon a pulse counter is incremented (1818).

The DC motor phase detection algorithm 1800 counts the commutation current pulses via the pulse counter and calculates the relative distance that the motor shaft has traveled as follows. The relative motor phase $θ_A$ is equal to the number of commutation pulses divided by the number of commutator brushes 1702 and by the number of commutator segments 1710, given that the number of brushes is even and the number of segments is odd:

$$\theta_\Delta = \frac{\sum pulses}{N_{brushes} \times N_{segments}} \text{ (Rotations)}$$

The DC motor phase detection method can determine the absolute phase of the motor shaft θ if the initial location $\theta_0$ is known at the beginning of the movement.

$$\theta = \theta_0 + \theta_\Delta \quad \text{(Rotations)}$$

Figure 19A:
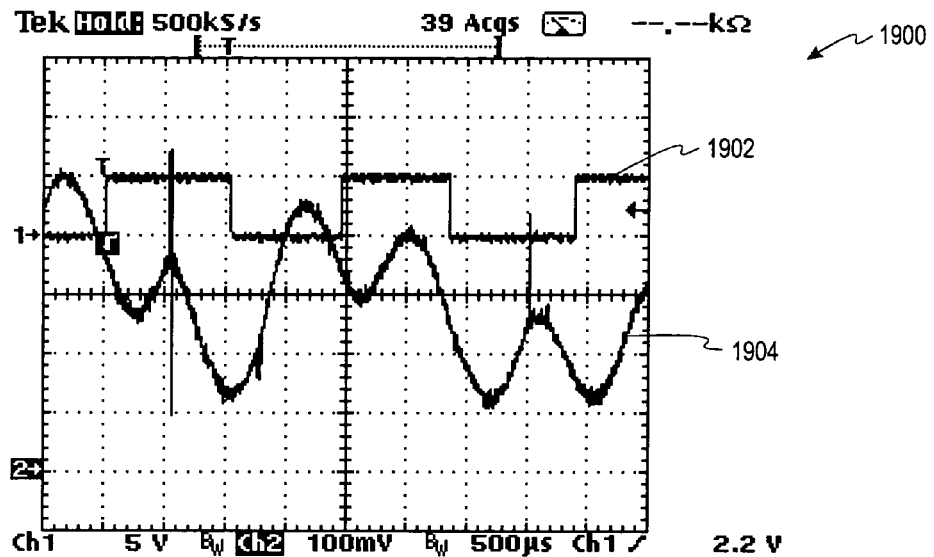
FIG. 19a is an exemplary plot of a waveform of the steady-sate current signal to a DC motor and a waveform of a commutation pulse detection output produced according to an aspect of the present invention.

FIG. 19a shows a plot of a typical DC motor with steady state current is of 60 mA producing constant torque at the motor shaft. Waveform 1904 plots the DC-coupled motor current (5V/1 A) and waveform 1902 plots the phase detection algorithm 1800 output (1 output transition per commutator pulse).

In FIG. 19a, the motor current has a large commutator ripple component. The commutator current pulses are unbalanced with the trailing and falling edge amplitude and duration varying with each pulse. Some of the positive pulse peaks do not rise above the current average and some of the negative pulse peaks do not fall below the current average.

The irregularity of the commutator ripple current makes using a zero-crossing detection method difficult and may cause some of the pulses to not be detected. The change in slope of the commutator ripple current is clear, although varying in duration and magnitude. The DC motor phase detection algorithm 1800 uses the change in slope over time to correctly identify each motor current commutation pulse.

Figure 19B:
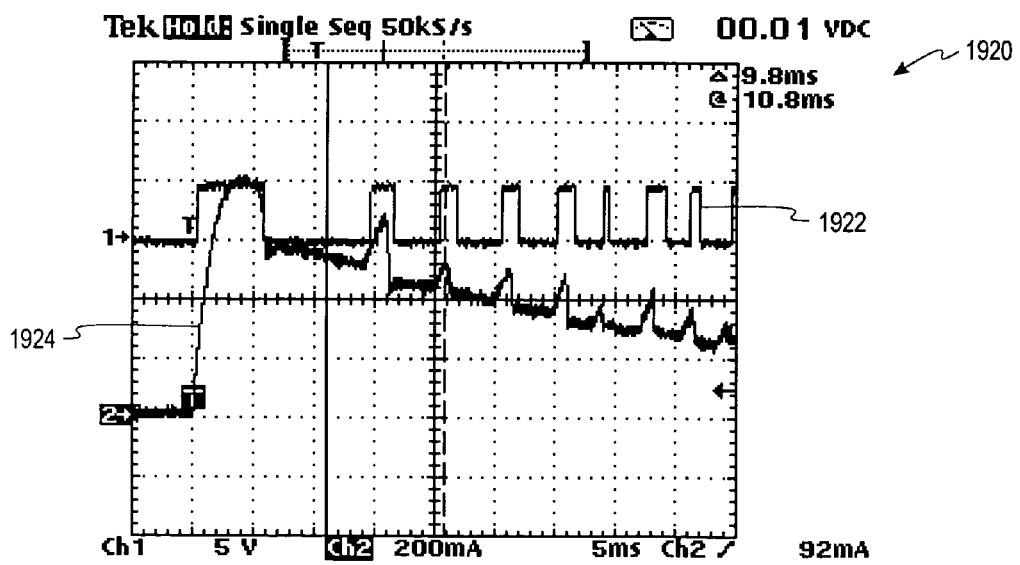
FIG. 19b is an exemplary plot of another waveform of the start-upcurrent signal to a DC motor and another waveform of a commutation pulse detection output produced according to an aspect of the present invention.

FIG. 19b shows a plot of a typical DC motor with in-rush current of 800 mA producing start-up torque at the motor shaft. Waveform 1924 plots the DC-coupled motor current and waveform 1922 plots the phase detection algorithm 1800 output (1 output pulse per commutator pulse).

In FIG. 19b, the motor current has a much smaller but still significant commutator ripple component. The average motor current level is decreasing as fast as the level of the commutation pulse peaks. Some of the positive pulse peaks do not rise above the motor current average for the previous commutator pulse.

The fast change in average current and the irregularity of the commutator ripple current again make using a zero-crossing detection method difficult and may cause some of the pulses to not be detected during motor start-up. The change in slope of the commutator ripple current is clear, although the average motor current is rapidly changing. The DC motor phase detection algorithm 1800 uses the change in slope over time to again correctly identify each motor current commutation pulse.

The DC motor phase detection algorithm advantageously does not require external position sensing hardware such as optical encoders, magnetic encoders, or limit switches which increase the cost of a product and are additional parts that can fail which can increase the complexity and reduce the reliability. Moreover, the DC motor phase detection method is computationally simple and can be implemented on an inexpensive microprocessor which reduces product complexity and cost. The method is less complex than digital signal processing methods and is more robust than zero-crossing detection methods.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of verifying a position of a transfer switch mechanism for connecting a load to one of at least two power sources, the transfer switch mechanism having at least two positions adapted to electrically couple said load to one of said at least two power sources, comprising:
    measuring a voltage across said load and across each of said at least two power sources;
    calculating, based on said measuring, one or more voltage characteristics of said voltage across said load and across each of said at least two power sources, said one or more voltage characteristics being at least one of a magnitude, a period, or a phase;
    determining whether said one or more voltage characteristics associated with said load matches said one or more voltage characteristics associated with any of said at least two power sources, thereby verifying which of said at least two power source is electrically coupled to said load;
    responsive to said determining, providing data indicating which of said at least two positions said transfer switch mechanism is currently in; and
    actuating or not actuating said transfer switch mechanism based on said data to change said transfer switch mechanism to the other of said at least two positions.

2. The method of claim 1, wherein said one or more voltage characteristics includes said magnitude, said period, and said relative phase, said magnitude being a root mean squared (RMS) magnitude of said measured voltage.

3. The method of claim 1, further comprising, determining that one of said at least two power sources are synchronized with said load when said one or more voltage characteristics associated with respective ones of said at least two power sources match the corresponding voltage characteristic of said load within a predetermined tolerance.

4. The method of claim 1, further comprising outputting a measurement error if said one or more voltage characteristics associated with said load does not match any of said one or more voltage characteristics associated with each of said at least two power sources.

5. The method of claim 1, wherein said voltage is an instantaneous voltage.

6. The method of claim 1, wherein said at least two power sources are asynchronous relative to one another.

7. A method of automatically controlling a plurality of switches, each connected to one of a plurality of power sources, comprising:
    measuring an instantaneous voltage on a load connectable to any one of said power sources;
    measuring an instantaneous voltage on each of said power sources;
    calculating a set of voltage characteristics for each of said load and said power sources based on their respective instantaneous voltage measurements, said voltage characteristics including a voltage magnitude, period, and phase;
    determining whether said set of voltage characteristics for said load matches within a predetermined tolerance said set of voltage characteristics for any of said power sources;

responsive to determining a match between said load and a selected one of said power sources, storing data indicating a state of the switch associated with said selected power source;

instructing a first one of said switches to move to an open position, confirming whether said first switch is in said open position by comparing said set of voltage characteristics for said load with said set of voltage characteristics for the power source associated with said first switch;

if said comparing confirms that said first switch is in said open position, instructing a second one of said switches to move to a closed position, and, responsive to said instructing said second switch, confirming whether said second switch is in said closed position by comparing said set of voltage characteristics for said load with said set of voltage characteristics for the power source associated with said second switch; and determining whether any two of said power sources are synchronized, and, if so, instructing at least one of said switches to move to an open position.

8. The method of claim 7, further comprising determining whether said set of voltage characteristics associated with any two of said power sources match one another within a predetermined tolerance, and, if so, indicating that those two power sources are synchronized.

9. The method of claim 7, further comprising determining whether said set of voltage characteristics for said load matches, within a predetermined tolerance, any of said set of voltage characteristics for said power sources, and, if none of said set of voltage characteristics for said power sources matches within said predetermined tolerance said set of voltage characteristics for said load, outputting an error.

10. The method of claim 7, responsive to said determining said match between said load and said selected one of said power sources, storing data indicating a state of the switch associated with another one of said power sources besides said selected power source.

11. The method of claim 7, wherein said switches are disposed in a transfer switch mechanism having a motor for automatically moving each of said switches from open and closed positions.

12. The method of claim 7, wherein said switches are disposed in a circuit breaker.

* * * * *